US011138632B2

(12) United States Patent
Heiser, II et al.

(10) Patent No.: US 11,138,632 B2
(45) Date of Patent: Oct. 5, 2021

(54) SYSTEM AND METHOD FOR AUTHENTICATING A CUSTOMER FOR A PRE-APPROVED OFFER OF CREDIT

(71) Applicant: Segmint Inc., Akron, OH (US)

(72) Inventors: Russel Robert Heiser, II, Mogadore, OH (US); Nathan W. Shahan, Tallmadge, OH (US); Keith Weitz, Shaker Heights, OH (US)

(73) Assignee: SEGMINT INC., Cuyahoga Falls, OH (US)

( * ) Notice: Subject to any disclaimer, the term of this patent is extended or adjusted under 35 U.S.C. 154(b) by 0 days.

(21) Appl. No.: 15/253,026

(22) Filed: Aug. 31, 2016

(65) Prior Publication Data

US 2016/0371732 A1  Dec. 22, 2016

Related U.S. Application Data

(63) Continuation-in-part of application No. 14/023,963, filed on Sep. 11, 2013, which is a continuation-in-part
(Continued)

(51) Int. Cl.
*G06Q 30/02* (2012.01)
*G06Q 40/02* (2012.01)
*G06F 16/9535* (2019.01)

(52) U.S. Cl.
CPC ..... *G06Q 30/0255* (2013.01); *G06F 16/9535* (2019.01); *G06Q 30/0251* (2013.01); *G06Q 30/0277* (2013.01); *G06Q 40/025* (2013.01)

(58) Field of Classification Search
CPC ............. G06F 17/30867; G06Q 30/02; G06Q 30/0615; H04L 2463/102; H04L 63/102; Y10S 707/99943
(Continued)

(56) References Cited

U.S. PATENT DOCUMENTS 5,319,542 A   6/1994  King, Jr. et al.
5,442,771 A   8/1995  Filepp et al.
(Continued)

FOREIGN PATENT DOCUMENTS

CA   2307484 A1 * 11/2000 ......... G06Q 30/0202
EP   0 991 006 A2   4/2000
EP   1315951 A2 *  6/2003 ............. G06Q 20/42

OTHER PUBLICATIONS

'Image Data Mining of Check Transactions: Techniques and Applications' (2002) Journal of Information Technology Cases & Applications, 4(4), pp. 4-21. doi: 10.1080/15228053.2002.10856008. (Year: 2002).*
(Continued)

*Primary Examiner* — Kambiz Abdi
*Assistant Examiner* — Scott Snider
(74) *Attorney, Agent, or Firm* — Fay Sharpe LLP

(57) ABSTRACT

A method of providing a personalized advertisement campaign includes identifying at least one customer of a financial institution via at least one cookie associated with the at least one customer; matching a prospective unique customer identification code with at least one key lifestyle indicator, which describe customer attributes, associated with the at least one customer; delivering online a pre-advertisement to at least one selected customer that is matched with the key lifestyle indicators; receiving an authentication of at least one selected customer from the financial institution; and delivering a financial application form associated with the pre-advertisement to the at least one authenticated customer who accepts the pre-advertisement.

20 Claims, 21 Drawing Sheets

Related U.S. Application Data of application No. 13/549,813, filed on Jul. 16, 2012, now Pat. No. 8,874,465, which is a continuation of application No. 12/403,656, filed on Mar. 13, 2009, now Pat. No. 8,239,256, which is a continuation-in-part of application No. 12/266,199, filed on Nov. 6, 2008, now Pat. No. 8,234,159.

(60) Provisional application No. 62/212,901, filed on Sep. 1, 2015, provisional application No. 61/037,020, filed on Mar. 17, 2008.

(58) Field of Classification Search
USPC ........................................................ 705/14.1
See application file for complete search history.

(56) References Cited

U.S. PATENT DOCUMENTS

| | | | |
|---|---|---|---|
| 5,446,891 | A | 8/1995 | Kaplan et al. |
| 5,642,485 | A | 6/1997 | Deaton et al. |
| 5,644,723 | A | 7/1997 | Deaton et al. |
| 5,649,114 | A | 7/1997 | Deaton et al. |
| 5,687,322 | A | 11/1997 | Deaton et al. |
| 5,796,967 | A | 8/1998 | Filepp et al. |
| 5,852,775 | A | 12/1998 | Hidary |
| 5,961,593 | A | 10/1999 | Gabber et al. |
| 6,055,510 | A | 4/2000 | Henrick et al. |
| 6,073,140 | A | 6/2000 | Morgan et al. |
| 6,128,663 | A | 10/2000 | Thomas |
| 6,216,129 | B1 | 4/2001 | Eldering |
| 6,236,975 | B1 | 5/2001 | Boe et al. |
| 6,266,649 | B1 | 7/2001 | Linden et al. |
| 6,317,722 | B1 | 11/2001 | Jacobi et al. |
| 6,330,543 | B1 | 12/2001 | Kepecs |
| 6,424,949 | B1 | 7/2002 | Deaton et al. |
| 6,519,571 | B1 | 2/2003 | Guheen et al. |
| 6,523,041 | B1 | 2/2003 | Morgan et al. |
| 6,560,578 | B2 | 5/2003 | Eldering |
| 6,684,195 | B1 | 1/2004 | Deaton et al. |
| 6,766,327 | B2 | 7/2004 | Morgan, Jr. et al. |
| 7,062,510 | B1 | 6/2006 | Eldering |
| 7,072,849 | B1 | 7/2006 | Filepp et al. |
| 7,213,032 | B2 | 5/2007 | Mascarenhas |
| 7,729,945 | B1 | 6/2010 | Katz et al. |
| 7,930,252 | B2 | 4/2011 | Bender et al. |
| 8,239,256 | B2 | 8/2012 | Heiser, II et al. |
| 8,500,011 | B2 * | 8/2013 | Song .................. H04L 63/08 235/380 |
| 2001/0034651 | A1 | 10/2001 | Marks et al. |
| 2001/0036224 | A1 * | 11/2001 | Demello .............. H04L 67/306 375/220 |
| 2001/0037289 | A1 * | 11/2001 | Mayr ................... G06Q 40/025 705/38 |
| 2001/0049620 | A1 | 12/2001 | Blasko |
| 2002/0003162 | A1 | 1/2002 | Ferber et al. |
| 2002/0019764 | A1 | 2/2002 | Mascarenhas |
| 2002/0026345 | A1 | 2/2002 | Juels |
| 2002/0046341 | A1 | 4/2002 | Kazaks et al. |
| 2002/0072975 | A1 | 6/2002 | Steele et al. |
| 2002/0099605 | A1 | 7/2002 | Weitzman et al. |
| 2002/0103698 | A1 | 8/2002 | Cantrell |
| 2002/0107728 | A1 * | 8/2002 | Bailey .................. G06Q 30/02 705/14.49 |
| 2002/0111863 | A1 | 8/2002 | Landesmann |
| 2002/0116312 | A1 * | 8/2002 | Talbot .................. G06Q 40/08 705/37 |
| 2002/0188507 | A1 | 12/2002 | Busche |
| 2002/0194058 | A1 | 12/2002 | Eldering |
| 2003/0018613 | A1 * | 1/2003 | Oytac ................... G06Q 30/02 |
| 2003/0028451 | A1 * | 2/2003 | Ananian ........... G06F 17/30867 705/26.42 |
| 2003/0033199 | A1 | 2/2003 | Coleman |
| 2003/0040959 | A1 | 2/2003 | Fei et al. |
| 2003/0055723 | A1 | 3/2003 | English |
| 2003/0168510 | A1 | 9/2003 | Allen |
| 2003/0208588 | A1 | 11/2003 | Segal |
| 2003/0222134 | A1 | 12/2003 | Boyd |
| 2004/0044627 | A1 | 3/2004 | Russell et al. |
| 2004/0172343 | A1 | 9/2004 | Allibhoy et al. |
| 2004/0225609 | A1 | 11/2004 | Greene |
| 2004/0230593 | A1 | 11/2004 | Rudin et al. |
| 2005/0038699 | A1 | 2/2005 | Lillibridge et al. |
| 2005/0131758 | A1 | 6/2005 | Desikan et al. |
| 2006/0026067 | A1 | 2/2006 | Nicholas et al. |
| 2006/0074769 | A1 | 4/2006 | Looney et al. |
| 2006/0080238 | A1 | 4/2006 | Nielsen et al. |
| 2006/0161599 | A1 | 7/2006 | Rosen |
| 2006/0178935 | A1 | 8/2006 | Barton et al. |
| 2006/0178986 | A1 | 8/2006 | Giordano et al. |
| 2006/0287919 | A1 | 12/2006 | Rubens et al. |
| 2007/0011224 | A1 | 1/2007 | Mena |
| 2007/0038516 | A1 | 2/2007 | Apple et al. |
| 2007/0067297 | A1 | 3/2007 | Kublickis |
| 2007/0124425 | A1 | 5/2007 | Gross |
| 2007/0250390 | A1 | 10/2007 | Lee et al. |
| 2007/0260508 | A1 | 11/2007 | Barry et al. |
| 2008/0004884 | A1 | 1/2008 | Flake et al. |
| 2008/0005313 | A1 | 1/2008 | Flake et al. |
| 2008/0009268 | A1 * | 1/2008 | Ramer .............. G06F 17/30867 455/412.1 |
| 2008/0010206 | A1 | 1/2008 | Coleman |
| 2008/0086365 | A1 | 4/2008 | Zollino et al. |
| 2008/0091535 | A1 * | 4/2008 | Heiser, II ............... G06Q 30/02 705/14.45 |
| 2008/0103971 | A1 * | 5/2008 | Lukose ................ G06Q 20/105 705/40 |
| 2008/0120155 | A1 * | 5/2008 | Pliha ...................... G06Q 40/00 705/14.17 |
| 2008/0140522 | A1 | 6/2008 | Tutone |
| 2008/0140525 | A1 | 6/2008 | Lamsfuss et al. |
| 2008/0215426 | A1 | 9/2008 | Guldimann et al. |
| 2008/0281601 | A1 | 11/2008 | Reichardt et al. |
| 2009/0048969 | A1 * | 2/2009 | Bishop .................... G06Q 20/10 705/39 |
| 2009/0119299 | A1 * | 5/2009 | Rhodes ............. G06F 17/30867 |
| 2009/0157472 | A1 | 6/2009 | Burazin et al. |
| 2009/0157542 | A1 * | 6/2009 | Ingerman .............. G06Q 40/025 705/38 |
| 2010/0074421 | A1 | 3/2010 | Anderson |
| 2010/0087175 | A1 | 4/2010 | Roundtree |
| 2010/0106498 | A1 | 4/2010 | Morrison |

OTHER PUBLICATIONS

Elliott, G. and Glynn, W. (1998) 'Segmenting Financial Services Markets for Customer Relationships: A Portfolio-Based Approach', Service Industries Journal, 18(3), pp. 38-54. doi: 10.1080/02642069800000031. (Year: 1998).*

Wen-Jang, K. & Su-Fang, L. 2004, "An Exploratory Analysis of Relationships Between Cellular Phone Uses' Shopping Motivators and Lifestyle Indicators", The Journal of Computer Information Systems, vol. 44, No. 2, pp. 65-73. (Year: 2004).*

Bad credit loans—convenient new online application form. (Feb. 11, 2013). PR Newswire Retrieved from https://dialog.proquest.com/professional/docview/1285483558?accountid=131444 (Year: 2013).*

Equifax brings digital certificates to online lending market; solution helps speed credit application processing and lender acquisition. (Jul. 4, 2006). M2 Presswire Retrieved from https://dialog.proquest.com/professional/docview/1079627186?accountid=131444 (Year: 2006).*

Hellauer, Brian "Banks Take Aim at Target Marketing" XP-001130643; Midcon U Conference Record, Ventura, CA, US, Feb. 1, 1993 (Feb. 1, 1993), 6 pages.

"How Mint Personal Finance Management Protects Your Financial Safety—Financial ...",http://www.mint.comsfe.html, 2 pgs., accessed Jul. 31, 2008.

Internet item: HTTP cookie—Wikipedia, the free encyclopedia; http://en.wikipedia.org/wiki/HTTP_cookie printed on Apr. 30, 2008.

(56) References Cited

OTHER PUBLICATIONS

Internet item: How to Build Lifestyle Indicator Files—theMarketingSite.com; http://www.themarketingsite.com/live/content.php?Item_ID=1123 printed on Jul. 14, 2008.

* cited by examiner

SYSTEM AND METHOD FOR AUTHENTICATING A CUSTOMER FOR A PRE-APPROVED OFFER OF CREDIT

This application claims priority benefit to U.S. Provisional Application No. 62/212,901 filed Sep. 1, 2015 and is a continuation-in-part of U.S. Non-Provisional application Ser. No. 14/023,963, filed Sep. 11, 2013 (METHOD AND SYSTEM FOR TARGETED CONTENT PLACEMENT) which is a continuation-in-part of U.S. patent application Ser. No. 13/549,813, filed Jul. 16, 2012 (METHOD AND SYSTEM FOR TARGETED CONTENT PLACEMENT), which is a continuation of U.S. patent application Ser. No. 12/403,656, filed Mar. 13, 2009 (METHOD AND SYSTEM FOR TARGETED CONTENT PLACEMENT), now U.S. Pat. No. 8,239,256, which is a continuation-in-part application to U.S. patent application Ser. No. 12/266,199, filed Nov. 6, 2008 (METHOD AND SYSTEM FOR TARGETED CONTENT PLACEMENT), now U.S. Pat. No. 8,234,159, which claims priority benefit to U.S. Provisional Application 61/037,020, filed Mar. 17, 2008, all of which are incorporated herein by reference in their entireties. U.S. patent application Ser. No. 11/865,466 filed Oct. 1, 2007 (PERSONALIZED CONSUMER ADVERTISING PLACEMENT) is also incorporated by reference herein.

BACKGROUND

Field

The following description relates generally to the targeting of media content to consumers. More particularly, the embodiments relate to data architecture and processing, and a database solution that will ultimately deliver personalized content, including advertisements, video, audio, audio/visual, text-based content, or any personalized media to a device, where the device can store a delivered identification and is operated by a consumer who is classified in a classification derived from financial information for that consumer.

Description of Related Art

Increasing Internet usage where nearly one billion global users access the Internet on at least a monthly basis is reflected by greater corporate spending on Internet advertising and more compelling and effective marketing technologies and practices. For example, Standard and Poor states that keyword search revenues contributed notably to these gains, with 182% growth in 2003, 51% growth in 2004, and 34% growth in 2005, largely reflecting the successes of Google and Yahoo. These companies garner revenues from specific user on-line queries that generate sponsored Internet links and associated click-throughs. This pattern of growth in Internet advertising is anticipated to continue well into the future.

To make their advertising dollars more effective, advertisers attempt to target their advertising to individuals who are more likely to have an interest in the advertised product, thereby producing a higher click-through rate and increased revenues. Of course, in order to target individuals with any degree of accuracy, something must be known about the individual. For this reason, technologies have been developed for what is known in the art as behavioral targeting based on tracking a user's habits through monitoring of the websites that the user visits, and offering targeted advertising based on the content of the visited websites. It is assumed, for example, that if a user is visiting automobile oriented websites, then an automobile oriented advertisement is more likely to generate a user response than one for breakfast cereal. A problem with this type of website tracking is that if an automobile advertisement for a very expensive car is delivered to a user and he cannot afford to purchase the automobile, then this advertisement is not very effective.

While the above-described behavioral profiling has been somewhat effective in improving the effectiveness of Internet advertising, such behavioral profiling is unable to accumulate data related to an individual's particular spending habits. For this reason, some marketers have developed methods to retain customers who have initiated purchases from them by tracking their purchasing habits and trends. However, this tracking of purchases is limited to knowledge of purchases placed on the marketer's own websites. While a marketer such as, e.g., Amazon might track a consumer's shopping habits so that when the consumer logs into an Amazon website at a future time, advertisements can be automatically placed showing suggested items for the consumer to consider based on their previous purchasing habits. Of course, Amazon would have no knowledge of the customer's purchasing habits at retailers not affiliated with Amazon. Therefore, the tracking methodologies used by individual on-line retailers are limited in the benefit that they can provide to the retailer.

SUMMARY

In one embodiment, a method of providing a personalized advertisement campaign includes identifying at least one customer of a financial institution via at least one cookie associated with the at least one customer; matching a prospective unique customer identification code with at least one key lifestyle indicator, which describe customer attributes, associated with the at least one customer; delivering online a pre-advertisement to at least one selected customer that is matched with the key lifestyle indicators; receiving an authentication of at least one selected customer from the financial institution; and delivering a financial application form associated with the pre-advertisement to the at least one authenticated customer who accepts the pre-advertisement.

financial application form In another embodiment, a system for providing a personalized advertisement campaign is provided. The system includes at least one database that stores at least one of a plurality of products associated with key lifestyle indicators of a plurality of financial institution customers. At least one processor is programmed to: identify at least one customer of a financial institution via at least one cookie associated with the at least one customer; match a prospective unique customer identification code with at least one key lifestyle indicator, which describe customer attributes, associated with the at least one customer; deliver online a pre-advertisement to at least one selected customer that is matched with the key lifestyle indicators; receive an authentication of at least one selected customer from the financial institution; and deliver a financial application form associated with the pre-advertisement to the at least one authenticated customer who accepts the pre-advertisement.

financial application form In a further embodiment, a system for providing a personalized advertisement campaign is provided. The system includes at least one database that stores at least one of a plurality of products associated with key lifestyle indicators of a plurality of financial institution customers. At least one processor is programmed to: identify at least one customer of a financial institution via at least one cookie associated with the at least one customer in which a status of anonymity being maintained for each customer of the at least one customer; receive the at least one cookie and a prospective unique customer identification code from the financial institution; match the prospective unique customer identification code with at least one key lifestyle indicator, which describe customer attributes, associated with the at least one customer; deliver online a pre-advertisement to at least one selected customer that is matched with the key lifestyle indicators; receive an authentication of at least one selected customer from the financial institution; match the prospective unique customer identification code to the at least one authenticated customer when at least one prospective customer accepts the pre-advertisement; deliver a financial application form associated with the pre-advertisement to the at least one authenticated customer who accepts the pre-advertisement; and. receive a status of the financial application form from the financial institution associated with the at least one prospective customer, the status being indicative of one of complete, incomplete, and not applied, a status of complete being associated with at least one designated customer of the plurality of prospective customers.

financial application form financial application form The foregoing summary is provided only by way of introduction. All features, benefits, and advantages of the personalized consumer content architecture/solution may be realized and obtained by instrumentalities and combinations particularly pointed out in the claims. Nothing in this section should be taken as a limitation on the claims, which define the scope of the invention.

The subject development is also applicable to the other entities or financial institutions who maintain personalized web sites in association with customers' financial data, such as insurers, investment counselors, brokers or the like.

DESCRIPTION OF THE EMBODIMENTS

The following is a description of a system and method of delivering personalized content, e.g. advertisements, video, audio, audio/visual and text-based content, for an anonymous network user on a network such as, e.g., the Internet. An example of such a system is described so that one may construct the system, however, the embodiments which are defined by the appended claims are not limited to the system described herein.

Figure 1:
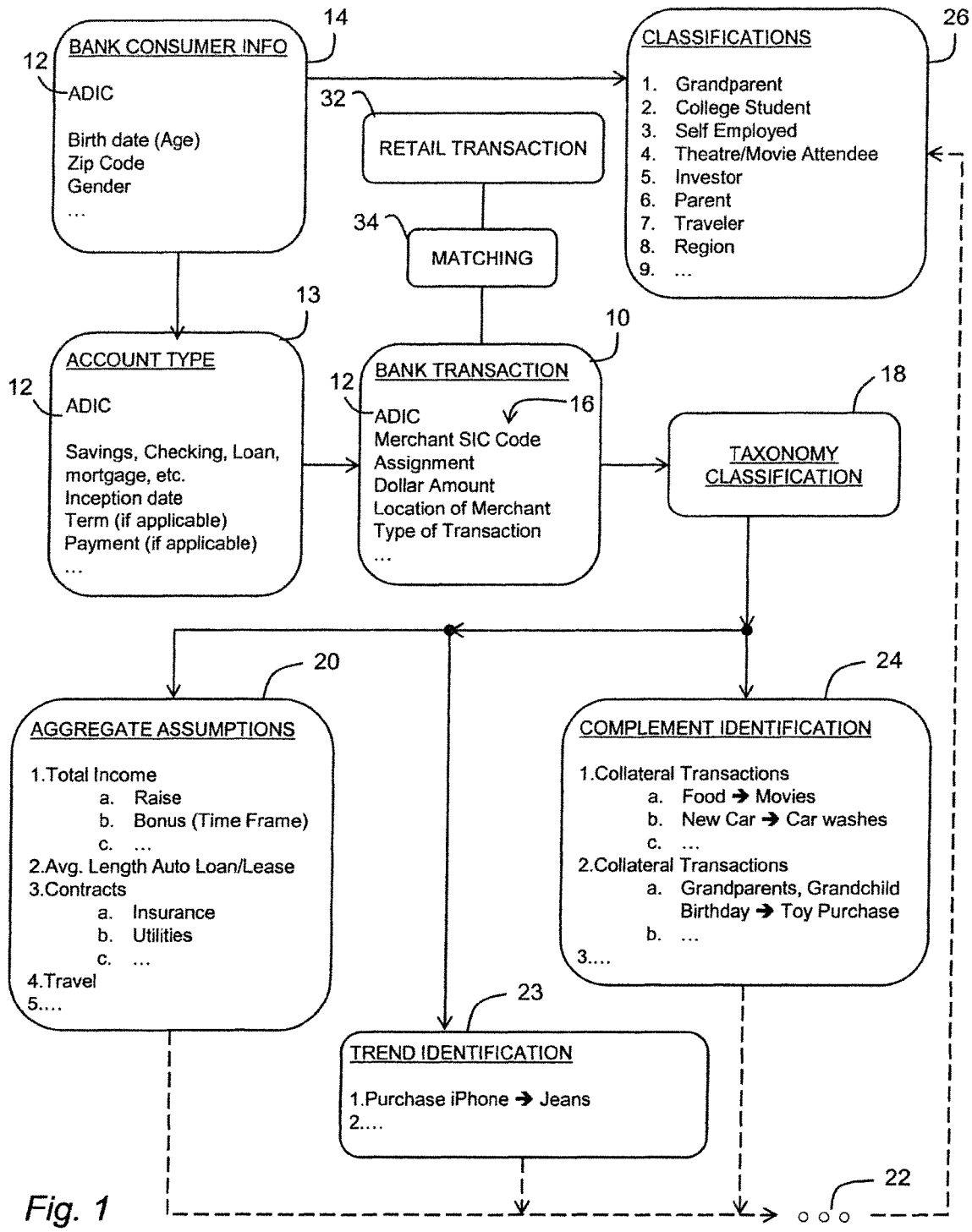
FIG. 1 is a block diagram depicting processes for generating lifestyle indicators for consumers.

With reference to FIG. 1, a diagram is provided in block form for showing the flow of information in a system for determining classifications for individuals who will be receiving targeted content over a network, e.g., the Internet. The diagram is provided for the purpose of explaining interrelationships between various data in the system, and the embodiments of the present application are not limited to the arrangement shown. Although each of the blocks in the diagram is described sequentially in a logical order, it is not to be assumed that the system processes the described information in any particular order or arrangement.

Before describing each of the processes shown in the figure in detail, a brief explanation of terms and object of the processing is provided. Four types of information are described in FIG. 1. Bank consumer information 14 is anonymous demographic data about a consumer as an individual such as, e.g. birth date, gender, zip code, etc. The bank consumer information utilized in preferred embodiments is data that does not reveal the identity of the consumer. Accordingly, the bank consumer information used in the embodiment described herein does not include name, street address, social security number (or any other government issued identification number), e-mail address or telephone number. Bank account type information 13, on the other hand, while also being associated with the consumer, provides information related to an account or accounts held by the consumer at the bank or financial institution. The account type information includes data describing the type of account(s), e.g., savings, checking, mortgage, IRA, credit card account, asset loan etc. It also includes information related to each account, as applicable, such as inception date, terms for mortgages or certificates of deposit, payment amounts for mortgages or other loans, and so forth. Similar to the bank consumer information, in the embodiment described herein the bank account type information does not include the account number of the consumer. This further protects the privacy of the consumer by anonymously identifying the consumer in a manner that will be described in more detail herein. Bank transaction data 10 describes individual transactions transacted by the consumer such as, e.g. a credit/debit card purchase at a retailer location. The bank transaction data includes information such as a merchant/retailer identifier, the total transaction dollar amount of the transaction, the type of transaction, the location of the merchant, etc. Bank transaction data also includes automated clearing house (ACH) transactions and automatic withdrawals. The bank transaction data 10 typically does not, however, provide detailed line item information for each item that was part of a multiple-item purchase. In preferred embodiments, however, retailers or service providers opt to provide receipt-level retail transaction information 32. This information is more detailed and includes line item detail identifying each item and quantity purchased from the retailer/service provider, along with the price of the individual items. Although not essential to determining classifications, described more fully below, the system and processes described herein can protect the identity of the consumer by anonymously identifying the consumer based on the data described above. This can protect the consumer from security breaches, where the consumer's identity can be used to his detriment, e.g. using a consumer's identity for fraudulent transactions.

The use of each of the above-described types of information is described in more detail below. However, an object of embodiments of the present application is to classify consumers into lifestyles or classifications based on the above-described information. These classified lifestyles are provided so that targeted content can be delivered to the consumers based on the lifestyle of the particular consumer. The classifications can also protect a consumer's identity by referring to a consumer as a member of a class as opposed to as a specific individual. The classifications can be deduced based on the status of the consumer, e.g., whether the consumer is a grandparent, a college student, a single mother, etc. The classification can be based on the activities in which the consumer participates such as golfing or attending theatres. The classification can also be based on what the consumer owns, e.g., a home owner or a boat owner, or on the income of the consumer. The classification can include multiple classifications, e.g. a grandparent who golfs. The classification is meant to classify consumers into categories helpful to merchandisers seeking to deliver targeted advertisements. The classifications can also help publishers to provide more meaningful content to viewers of the content. Examples of such classifications include, but are not limited to grandparent, college student, self employed, theatre/movie attendee, investor, parent, traveler, region of residence or travel, etc. The classifications described herein are hierarchical in nature. For example, if a consumer is identified and classified with a classification as a "mother", the classification for mother falls under a higher-level classification for "female". This hierarchical relationship is discussed in further detail herein.

First described, are incoming bank transactions. Although the term "bank transaction" is used throughout this application, it is to be appreciated that the transaction may be related to any form of financial institution with which a user of the system conducts business or has a relationship.

Typically, the financial institution will provide on-line services for the user enabling the user by means of a unique user ID and password, or other security data, to either log in or sign in with a website or other networked portal or application affiliated the financial institution for conducting business. When the user logs on to the financial institution's website or other networked application, the user is identified by a unique customer identification code (UCIC) assigned by the financial institution. The UCIC does not include the financial institution's customer password or unique user ID used to log onto the financial institution's website, nor does it include the customer's account number, name, street address, social security number, e-mail address or telephone number. The UCIC is matched to an anonymous identifier, hereinafter referred to as an advertisement delivery identification code (ADIC), which anonymously but uniquely identifies the user. Even though the term ADIC is used to refer to the identification, this identification can be useful when delivering other targeted content, e.g. video, text-based content that does not market a product. The ADIC is assigned by the entity that will deliver the targeted content or will associate with another publisher to deliver more relevant content. Both the ADIC and the UCIC are described in more detail in the above-referenced application Ser. No. 11/865,466. The ADIC can also be specific to the device the financial institution's customer uses to access the financial institution's website or other networked application. For example, if the one customer use a lap top computer and a mobile phone to access the financial institution's website or other networked application, this same customer can be associated with two different ADICs, one for each device.

Three types of information received from financial institutions are discussed herein, i.e., bank consumer information, account type information, and account-level bank transaction information. As previously described, each received bank transaction includes information relating to a particular bank transaction, and the bank consumer information includes account-level detail information pertaining to the particular consumer. For example, the system receives consumer level information 14 that may include birthday and zip code which are useful so that, e.g., age and location can be determined for the consumer. Account type information 13 provides additional information related to the consumer such as the types of accounts held at the financial institution. The account-level bank transaction 10, on the other hand, provides information related to a purchase of goods or services from a merchant. It is to be understood, however, in preferred embodiments, the received information does not reveal the identity of the consumer, e.g., name, street address, social security number, telephone number, account number, credit card number, e-mail address, etc.

The account-level bank transaction data 16 includes, e.g., merchant SIC code, merchant description, price, asset information if the transaction relates to a loan, location of the merchant, preferably a zip code for the merchant, and the type of transaction. The standard industrial classification (SIC) is a code developed to classify establishments by the type of activity in which they are primarily engaged. For example, the SIC code 2043 represents cereal breakfast foods, and SIC code 4521 represents department stores. It is to be appreciated that the account-level bank transaction data 16 described herein is exemplary only. The data contained in the account-level bank transaction record can vary according to both embodiment and according to the financial institution providing the bank transaction 10. For example, the SIC code is being replaced with the North Atlantic Industry Classification System (NAICS). The NAICS code serves substantially the same purpose as the SIC code, however, the NAICS code has been extended to six digits in contrast to the four digit SIC code in order to accommodate a larger number of sectors and allow more flexibility in designating subsectors. The merchant description is usually a string of characters, which can be utilized in on-line banking, describing the particular merchant. The asset code, utilized with loans, can be useful for providing additional information. For example, each time a car payment is made, the system can determine what kind of car the consumer drives based on the information provided, e.g., the asset for which the loan was made.

The information provided in the account-level bank transaction data 16 and the bank consumer information data 14 can be useful in classifying customers and in developing the classifications 26. For example, the bank consumer information 14 provides a zip code related to the consumer, and the account-level bank transaction data 16 can provide a zip code related to the merchant. Based on these two zip codes, on analyzing purchases made for gasoline, the system is able to deduce what the consumer's approximate daily commute is, and how much the consumer is spending on gasoline. With this information, the consumer can be classified into a classification "commuter between 15-25 miles." Similarly, other classifications can be deduced from the transaction data. Another example of a classification is the user's debt/equity ratio, which represents the amount of debt for the user versus the amount of cash savings at the bank, or in the case of assets, some assets have an appraised value such as a car, home, etc. The debt/equity ratio can be deduced based on bank transaction data 16 and can be useful in targeting advertising to a firm or advertiser seeking investors.

As the bank consumer information 14 and the account-level bank transaction data 16 are being received, the information data is funneled through a taxonomy classification system 18. The taxonomy classification system 18 is where the system starts developing classification data. For example, based on analysis of the consumer information and account-level transaction information, the system can determine if the consumer is an SUV driver (based on the asset for which a loan has been secured), a homeowner (based on mortgage information), etc. The taxonomy system classifies consumers according to a classification system similar to the previously described SIC codes and NAICS codes or any industry supported classification. The SIC and NAICS codes however, are typically inadequate for purposes of embodiments of the present application and, therefore, a taxonomy classification coding that can go much deeper and provide more detailed classifications is utilized. Some suitable taxonomy classifications are known in the art, and it is to be appreciated that any arbitrary taxonomy classification coding or system can be utilized by the taxonomy classification system 18. Developing a taxonomy classification system, however, is an intensive and time-consuming process. Therefore, embodiments of the present application may utilize existing taxonomy classifications when possible.

An example here is useful in describing how the taxonomy classification system is able to deduce classifications based on the incoming bank consumer information and account-level bank transaction data. For example, an account-level bank transaction is received including an SIC code for a debit card purchase. As an example, the consumer made a purchase (or more likely repeated purchases) at Starbucks, and based on the SIC code representing coffee retailer, the consumer may be classified as a coffee drinker. As another example, a consumer may be associated with an asset code via the account type information 13 with an SUV (the consumer has a car loan for an SUV). Based on this, the consumer may be classified as an SUV driver. A taxonomy classification code is thereby assigned accordingly. It is to be appreciated also that no single taxonomy classification system can cover every possible classification and, therefore, taxonomy classification systems are subject to growth and evolution over time. The taxonomy classification system 18 analyzes incoming bank consumer information and account-level bank transaction data to deduce classification codes that are not provided in the incoming data. For example, the incoming consumer and account-level data does not typically include whether a consumer is a grandparent or an SUV driver. These classification codes can however be deduced by analysis and correlation of the incoming transactions and consumer information 14 for a given consumer.

It is to be appreciated that, although the merchant SIC code identifies only the merchant rather than the specific merchandise being purchased, arrangements can be made with specific merchants to obtain receipt-level data. In this case, the account-level transaction record information 10 can be combined with receipt-level retail transaction data 32 in a matching process 34 to identify specific products purchased at the merchant location. Combining this information can advantageously enable predicting future purchases based on the prior history of purchases. For example, when the account-level transaction record identifies that the user has shopped at a hardware store, and the receipt-level data indicates that the user has recently purchased drywall, drywall screws, and drywall compound, the system can automatically deduce that one of the consumer's next likely purchases will include sandpaper and/or paint. Those are referred to herein as collateral purchases and are of particular interest to advertisers because of the high likelihood of interest from the consumer in advertisements that are correctly targeted toward their next likely purchases.

The account-level bank transactions 10, the bank consumer information 14, the bank account type information 13 and the retail transaction data 32 can be further processed in an aggregate assumption phase 20. In the aggregate assumption phase, multiple account-level bank transactions for a particular consumer can be aggregated to make reasonable assumptions about the consumer's spending habits. Further, assumptions can be derived regarding annual income, when a raise is received, and when annual bonuses might be received. Assumptions regarding annual income can be derived based on recurring bank deposits and so forth. Automobile loan or lease transactions can be aggregated to determine the length of an auto loan or lease for the consumer. This sort of information can be particularly useful for targeting advertisements to the consumer as they approach the end of a loan or lease period. Contract data, such as, e.g., wireless contracts, insurance contracts, and utility contracts can be determined based on aggregation of the account-level bank transactions and retailer receipt-level data. Additional useful information which can be aggregated includes, but is not limited to, annual travel habits based on change of merchant zip codes, what cities are traveled, what time periods such travel is likely to occur, and so forth.

Assumptions deduced by the aggregate assumption phase 20 can be useful in generating classifications 26 and classifying consumers into classifications. For example, suppose that an advertiser wants to target individuals who travel at least 100,000 miles per year. Aggregate assumptions about annual travel from the aggregate assumption phase 20 can, based on trigger criteria, be utilized in a "Bubble-Up" process 22 to classify particular consumers' as travelers of at least 100,000 miles per year. Similarly, persons belonging to a grandparent taxonomy classification can be identified based on birth dates and data from the aggregate assumption phase 20 by examining purchases, over time, from toy stores. A person buying toys within the approximate same range of money each time every year at toy stores, particularly if the person is past age 60 for example, can be a good indication that the consumer is a grandparent. Further, this aggregate information can be useful in estimating grandchildren birthdays. And even further, based on the toys being purchased and the purchasing patterns, an estimation of the grandchildren's age can be determined. This information Bubbling Up to the classifications 26 can be very useful to advertisers for targeting advertisements to these consumers at appropriate times during the year.

It is to be appreciated that the Bubble-Up process 22 is not necessarily a continuous process that occurs with each received account-level bank transaction, but rather, triggers can be established in the aggregate assumption phase 20 such that when enough information has been aggregated to make the assumption useful as a classification, the information can then be Bubbled Up to the classifications 26. Referring again to the hierarchical nature of the classifications, information Bubbling Up as a classification can continue from the lowest level touched by the information to higher levels in the classification, touching elements on the way up. For example, a consumer identified as a mother can affects higher levels, i.e., female at the top level. However, the classification structure can be further described as being poly-hierarchical, i.e., a fork occurs when traversing the classifications in an upward direction. As an example, a consumer identified as a mother with a teenager, with aggregated transactions including six transactions in the last 12 months over $100, and having a daughter can affect multiple higher levels.

The taxonomy classification codes developed in the taxonomy classification phase 18 and/or transaction information are further processed in a complement identification phase 24. The complement identification phase 24 applies analytics for determining classifications 26 related to collateral transactions. For example, food purchases may be indicative of someone likely to view movies. A new car purchase can be an indication that car washes will be purchased more frequently. A grandparent, would likely purchase toys on a grandchild's birthday. Similarly a trend identification phase 23 applies analytics for determining classifications 26 related to identified purchasing trends. These identified trends are not necessarily obvious and are not determined based on obviousness, but instead are determined based on observed trends. For example, the system may determine over time that purchasers of iPhone mobile phones are likely to purchase jeans. These identified trends also contribute to the development of classifications. As with the aggregate assumption process 20, the complement identification phase 24 and the trend identification phase 23 also utilize the Bubble-Up process 22 to Bubble-Up information into the classifications 26.

The classifications represent information about a consumer related to their lifestyle which is useful to advertisers for targeting advertisements. The classifications also represent information about a consumer that is useful to website publishers. Examples of classifications include identification as a grandparent, college student, self-employed person, theater/movie attendee/watcher, investor, parent, and traveler. These examples, however, represent just a sampling of possible classifications used in embodiments of the present application. It is to be appreciated that, similar to the evolution of taxonomy classification codes, new classifications can be added over time and evolve as the need arises. Some classifications may expire or be removed over time, e.g., "married" becomes "divorced", which can also be "single," reinforcing the poly-hierarchal nature of the classifications.

The classification of a consumer can also be weighted for trueness. For example, for the classification "grandparent," a consumer is either a grandparent or not a grandparent—it is a true or false condition. Since the system does not know the identity of the consumer, and it is desirable that the system does not know the identity of the consumer, the system cannot be 100% sure that the consumer is a grandparent. For example, even though a consumer's age is known to be over 60 years, this consumer may or may not be a grandparent. Using other information known about the consumer, e.g. transactions at toy stores near holidays, deposits into college savings investment vehicles, transactions at retailers selling young children's clothing, a weight, e.g. on a scale of 1 to 10 or a percentage of trueness, can be assigned as to whether the consumer is to be classified in the "grandparent" classification. Even though the consumer is classified by the system as a grandparent, the consumer may not be a grandparent. That the consumer is not actually a grandparent may not be that important to a marketer seeking to market its goods and products to a grandparent. What can be important to a marketer is the fact that the consumer has the attributes of a grandparent.

Returning now to the trend identification phase 24, as previously discussed, trend transactions can be useful in determining classifications such as grandparents and grandchildren's birthdays. Also determined in the trend identification phase 24 are collateral transactions which are useful for targeting advertisements. For example, a new car purchase may be an indicator useful for targeting advertisements related to car care and car accessory equipment. It may be useful to identify restaurant goers as potential movie attendees, particularly if they have a history of attending movies. Moreover, triggers can be set up to classify consumers based on life changing events. For example, a moviegoer who has recently had kids can now be classified in a DVD renter/purchaser classification.

Figure 2:
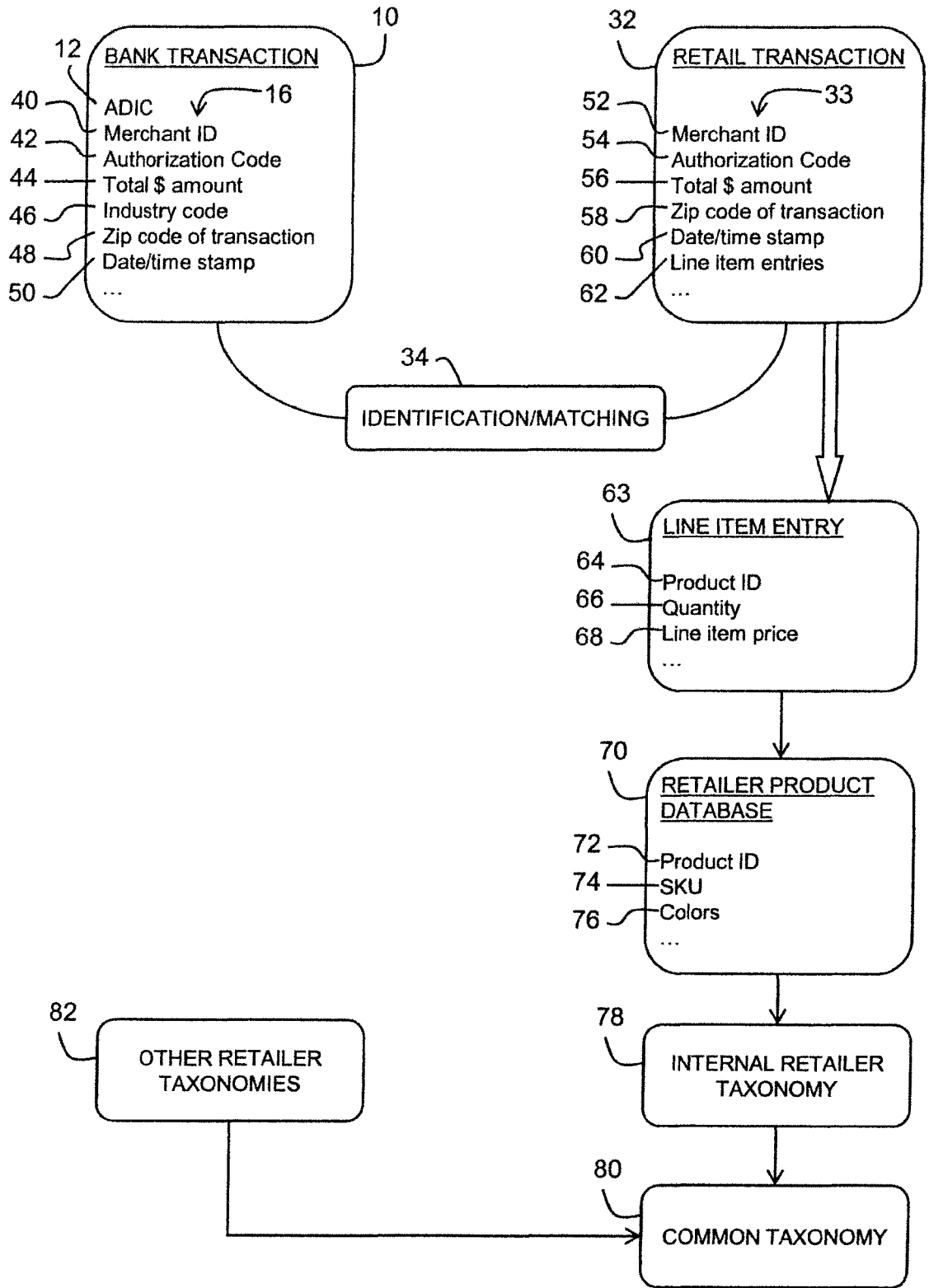
FIG. 2 is a block diagram depicting processes for matching receipt-level retail transactions to account-level bank transactions.

With reference now to FIG. 2, a block diagram is shown for matching the receipt-level retail transactions 32 to the bank transactions 10. As previously discussed, the account-level bank transaction 10 includes information related to the transaction, however, it is a summary including the total transaction amount and does not include individual line item detail, e.g., exactly what goods or services were purchased from the retailer or service provider. For example, the bank transaction shown includes a merchant identification 40, an authorization code 42, a total dollar amount 44, an industry specific code 46, a zip code 48 of where the transaction transpired, and a date/time stamp 50. It is to be understood that the bank transaction 10 shown in the figure is exemplary only for purposes of describing the present application. Data provided in the account-level bank transaction 10 can vary based on what individual financial institutions furnish to the campaign generation system. For example, the bank transaction shown in the figure includes an authorization code 42, however, some financial institutions may not provide the authorization code. The receipt-level retail transaction data 32 can also be stripped of personal information belonging to the consumer, e.g. the credit card or account number of the consumer making the purchase. This is desirable to protect the anonymity of the consumer.

Like with the account-level bank transaction 10, the receipt-level retail transaction 32 is not limited to the receipt-level data 33 as shown in the figure. The receipt-level data 33, as shown, includes a merchant identification 52, an authorization code 54, a total dollar amount 56, a zip code of where the transaction transpired 58, a date/time stamp 60, and line item data 62. The line item data 62 includes one or more line item entries 63 wherein each of the line item entries 63 corresponds to a product or service purchased. In the exemplary line item data entry 63 shown in the figure, there is included a product identifier 64, a quantity 66, and a line item price 68. The problem now is how to match the receipt-level retail transactions 32 to the corresponding account-level bank transactions 10 in the identification/matching 34.

With regard to matching the receipt-level retail transactions 32 to the account-level bank transactions 10, there are basically two scenarios described herein. In the first scenario, the bank transaction 10 can include a merchant identifier 40 and an authorization code 42, and the receipt-level retail transaction 32 similarly can include a merchant identification 52 and a merchant authorization code 54. Because each merchant can uniquely generate an authorization code for each retail transaction, the merchant identification 52 and the authorization code 54 can be used to readily match the receipt-level retail transaction to the account-level bank transaction simply by matching the respective merchant identifications 40, 52 and the respective authorization codes 42, 54.

In the second scenario, unlike in the first scenario, the authorization code is unavailable in either or both of the account-level bank transaction 10 and the receipt-level retail transaction 32. In this second scenario, matching analytics are used in the identification 34 to match the receipt-level retail transactions 32 to the account-level bank transactions 10. Various analytical comparisons can be utilized by the identification 34. For example, if the account-level bank transactions 10 and the receipt-level retail transactions 32 each include total dollar amount 44, 56, zip code of the transaction 48, 58, and a date/time stamp 50, 60, the respective transactions can be matched with a sufficient degree of certainty based on matching these three pieces of information. It is to be understood, however, that exact matches of individual fields are not required to successfully identify matching transactions. For example, it is to be expected that the date/time stamp provided with the receipt-level retail transaction 32 will not exactly match the date/time stamp of the account-level bank transaction 10. One reason for this is that some time may transpire between the time the retail establishment generated a date/time stamp for the receipt-level retail transaction and the time when the financial institution applies a date/time stamp to the received account-level bank transaction for the corresponding retail purchase. Although the date/time stamp may not exactly match, it is only necessary that it be close enough or within a given range so that, when combined with the other data, such as the dollar amount and zip code, there is a reasonable degree of certainty that the transactions can be successfully matched.

It is also anticipated that range comparisons may be appropriate for other data fields used by the identification 34. For example, although the total dollar amount 44, 56 is typically provided as an exact amount, e.g., $3.17, some financial institutions offer programs to their customers which may cause the total dollar amount to vary. For example, at least one financial institution is known to offer a service where the total dollar amount is rounded up to the nearest whole dollar when the retail transaction information is received by the financial institution, e.g., $3.17 is rounded up to $4.00. The difference between the two amounts is then deposited into a savings account for the consumer. In this particular case, the total dollar amount of the receipt-level retail transaction 32 and the account-level bank transaction 10 can be expected to match only to the nearest dollar. However, if the particular financial institution offering this program also provides account-level transaction data for the savings account to which the difference is deposited, the identification 34 can utilize additional analytics to identify the savings account deposit of the difference and thereby improve the accuracy of the identification process. Again, it is to be appreciated that the identity of the consumer is neither available nor needed in performing these identification analytics. Therefore, the consumer remains anonymous to the system, thereby assuring privacy regarding the consumer's identification.

Various other issues with respect to matching the account-level bank transaction 10 to the associated receipt-level retail transactions 32 are envisioned and fall within the scope of the present disclosure. For example, although the respective merchant identifications 40, 52, each include a specific merchant identification code, thereby enabling an exact match of the merchant identifiers, it is to be understood that the system can also match the merchants based on character descriptions of the merchants. As long as a merchant text description is provided for the merchant identification 40, 52, the account-level bank transactions and the receipt-level retail transactions can be matched at the merchant identification level.

Turning now to the line item entries 63, once the receipt-level retail transaction 32 has been matched to the account-level bank transaction 10, the line item entries can be further analyzed and utilized by the system. While the account-level bank transaction 10 is useful in determining classifications for the consumer, it is not possible to determine the particular products or services purchased based on the information provided, except in the rare instances when the merchant only provides one particular product or one particular service. The line item entry 63 is advantageously used for this purpose. For example, the line item entry 63 includes at least a product identifier 64, a purchase quantity 66, and a line item price 68. These data items provide the information which enables the system to determine and track products and services purchased by the consumer. This product information can be useful in determining purchasing trends of the consumer and can also be useful in anticipating future purchases based on the products purchased. For example, as previously described, a consumer purchasing drywall might be expected to purchase paint in the near future.

A problem arises, however, from the fact that various retail establishments utilize their own internal product identification codes. Therefore, additional processing of the product identifier 64 is necessary to recode the product identifier to a common coding system utilized by the campaign generation system. Identifying and converting the product identifier code to a common code can be accomplished in a variety of ways. One method, is to utilize a retailer database 70 provided by the retailer. The retailer database 70 enables the system to look up a product based on the product identifier 64 and obtain additional information regarding the product from the database table. As shown in the figure, the product database may include, associated with the product identifier 72, an SKU number 74, and various descriptive data for the product, such as, e.g., available colors 76. The database information, such as the SKU number 74, can be used to determine a taxonomy code for the product. For example, the retailer may utilize an internal taxonomy 78 for code defining their products.

It is to be appreciated, however, that the internal taxonomy 78 may be a proprietary taxonomy or an internal taxonomy utilized only by the particular retailer and may, therefore, not be directly useable by the advertisement campaign generation system for identification purposes. It is to be understood that, while the internal taxonomy 78 is shown as a separate entity in the figure, wherein the taxonomy code can be determined from information in the product database 70, it is also anticipated that the retailer database 70 may directly incorporate a taxonomy code for the particular product identifier 72. It is also anticipated that the internal taxonomy 78 may also be the same taxonomy utilized by the advertising system and, therefore, can be used directly for product identification. In the event that an internal taxonomy 78 is utilized, taxonomy codes from the internal taxonomy can be readily mapped to a common taxonomy 80 utilized by the campaign generation system.

It is to be understood that while the figure shows only one retailer, a number of retailers can be associated with the campaign generation system and operate in a similar fashion. For example, a second retailer internal taxonomy 82 is shown in the figure and can be similarly mapped to the common taxonomy 80. It is also to be appreciated that some retailers may utilize a separate third party taxonomy. This, however, only makes it necessary to map the third party taxonomy codes to the common taxonomy 80. It is to be further appreciated that there will not always exist an exact match between the internal taxonomy 78 and the common taxonomy 80. For example, some in-house or internal taxonomies can be sparse in cases where, e.g., the retailer utilizes broad-based taxonomy codes which cover a broad range of products. The hierarchical nature of the common taxonomy 80 can be advantageously utilized in this case. For example, the lowest levels in the common taxonomy 80 describe products to a high degree of detail. These lower level taxonomy codes, like the limbs of a tree, branch off of a higher level taxonomy code which represents a broader range. This enables the sparse internal taxonomy to be mapped to the common taxonomy 80, however, the mapping simply occurs at a higher level, i.e., broader level in the common taxonomy 80.

It is again to be appreciated that the identification process 34 described with reference to FIG. 2 is an anonymous matching process protecting the identity of the consumer. Even so, some financial institutions may desire to reduce the risk of personal identification even further. For example, a financial institution may only be willing to provide total transaction amounts 44 rounded to the nearest $0.10. This poses little problem to the matching process 34 because the analytics described provide for comparisons based on ranges as previously described. To further enhance security, it is envisioned that the advertising system can provide for the installation of export systems installed in-house in a site owned or operated by the financial institution desiring the service. Providing an in-house export system enables the financial institution to implement filters which ensure that no personal identification information is exported from the financial institution. The in-house export system may, e.g., be configured to export only known, non-sensitive data columns. The in-house export system can be further configured to perform an analytical security scanning of the data being exported as an additional level of security. For example, the system may be configured to monitor the outgoing data to ensure that no data, such as personal names, account numbers, or social security numbers are being inadvertently exported. An in-house export system gives the financial institution an added degree of confidence that the identity of their customers is protected.

Figure 3:
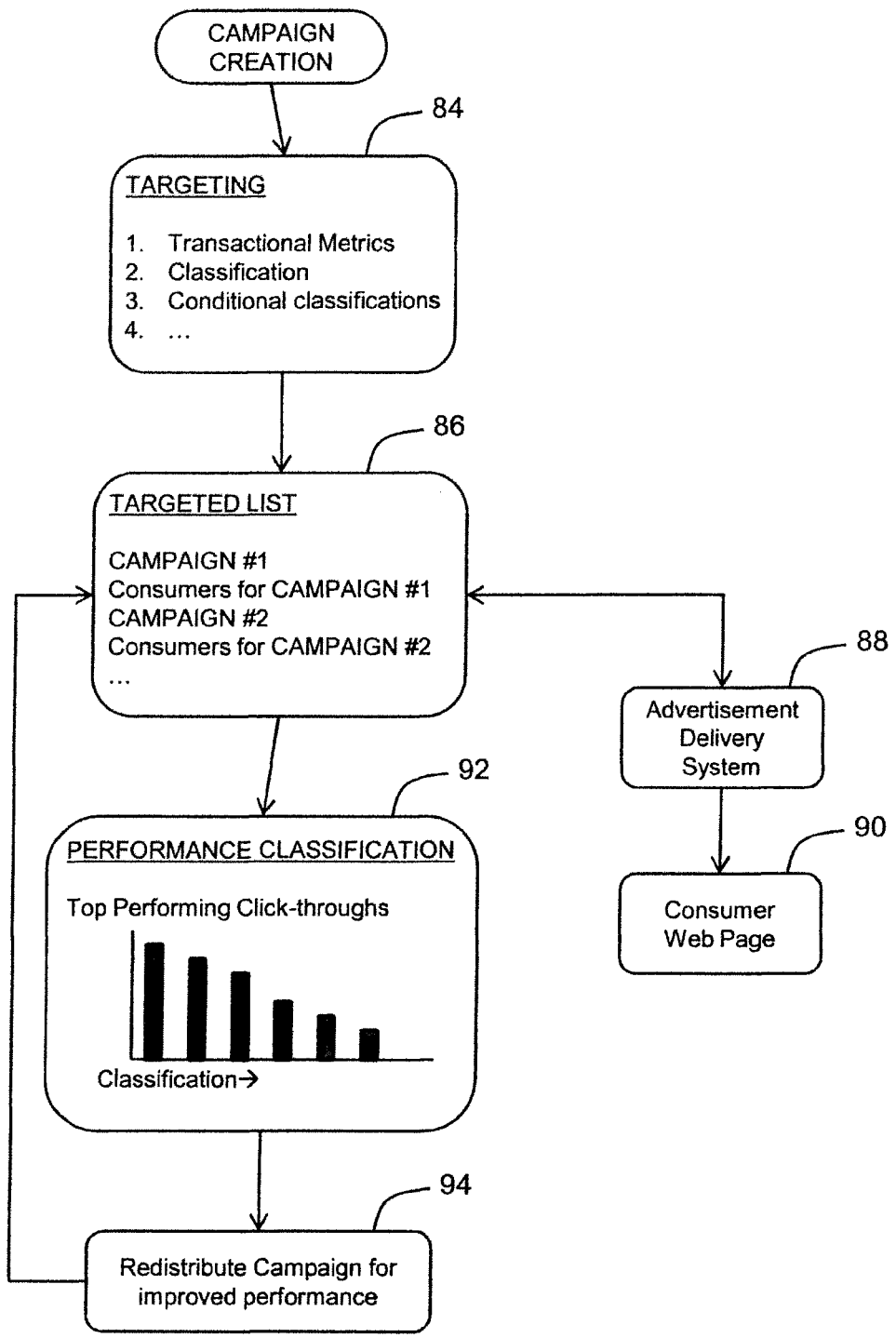
FIG. 3 is a block diagram depicting processes for creating and updating an advertising campaign based on the classifications.

With reference now to FIG. 3, a process is shown in summary form for advertising campaign creation. This process can also be employed for delivering other targeted media to viewers, not only advertisements. A targeting phase 84 utilizes, but is not limited to, three processing components to develop a targeted list 86. The targeting components of targeting phase 84 include transactional metrics as previously discussed based on account-level bank transactions, e.g., how much a consumer spends on their car which can be categorized within selected ranges. The previously described classifications 26 are useful for targeting advertisements as also previously described. However, the targeting phase 84 also performs analytics on classifications which are conditional, i.e., conditional classifications. Conditional classifications are those classifications which may be added to the targeted list or removed from the targeted list based on performance as described further below.

The targeted list 86 includes consumers targeted for a particular advertising campaign based on analytics performed by the campaign creation phase 84. Advertisements 88 are delivered to consumer on the targeted list 86 on web pages 90 as the advertising campaign progresses. Advertisements can be delivered over other platforms, e.g. file communication systems that may not be conducted with the Internet. The advertisements 88 can also be delivered to consumers who are not found on the targeted list. As the advertising campaign continues feedback from the advertising phase 88 is analyzed, e.g., based on click-through rates, and utilized to generate a performance classification chart 92. The performance classification chart 92 is used to identify the top performing click-through advertisements. Based on these click-through metrics, a redistribution phase 94 can redistribute the campaign targets in order to yield better results, i.e., higher click-through rates. To this end, embodiments of the present application are able to monitor the delivered targeted advertisements and determine when a click-through has occurred. The campaign redistribution feature can be an optional part of the advertisement campaign process. Advertisers can choose to have an advertisement campaign automatically analyzed and redistributed based on performance or to have the advertisement campaign remain fixed, but receive reports indicating not only the performance of the campaign, but potential performance based on a redistribution of the campaign.

It is to be appreciated, therefore, that embodiments of the present application not only effectively target consumers for advertising campaigns based on classifications, but also dynamically redistribute the campaign targets for improved results during the lifetime of the advertising campaign. For example, one of the classifications 26 might be related to zip codes in the north east section of the United States. Therefore, based on zip code a classification can be created for the north east. During the advertising campaign, the performance classification 92 may indicate a much higher click-through rate for the north east classification as opposed to the remainder of the country. So, based on this, the advertising campaign can be redistributed or retargeted to show increasing advertisements to those people in the north east and fewer advertisements in other areas of the country. It may be possible, therefore, to target additional consumers in the north east based on the north east classification which would have otherwise been missed in the original advertising campaign. Furthermore, if the advertisements are being delivered to consumers not found on the targeted list for the campaign, but the many consumers belonging to a particular classification not part of the targeted list click on the advertisement, then the advertisement can be redistributed to consumers who fall within the classification that are clicking on the advertisement.

It is to be appreciated that any data collected or mined in embodiments of the present application, regardless of the source, can be used to generate classifications. Retailer receipt data, or additional data from the retailer, browsing history, search history, and advertisement click history, to name a few, can be used to generate classifications. Preferred embodiments are able to collate this information in order to provide a more complete picture of the consumer. It is desirable, although not required, that the additional data still protect the anonymity of the consumer. The ADIC and the UCIC, being a unique but anonymous identification of the consumer, facilitates the collation of this consumer information.

Figure 4:
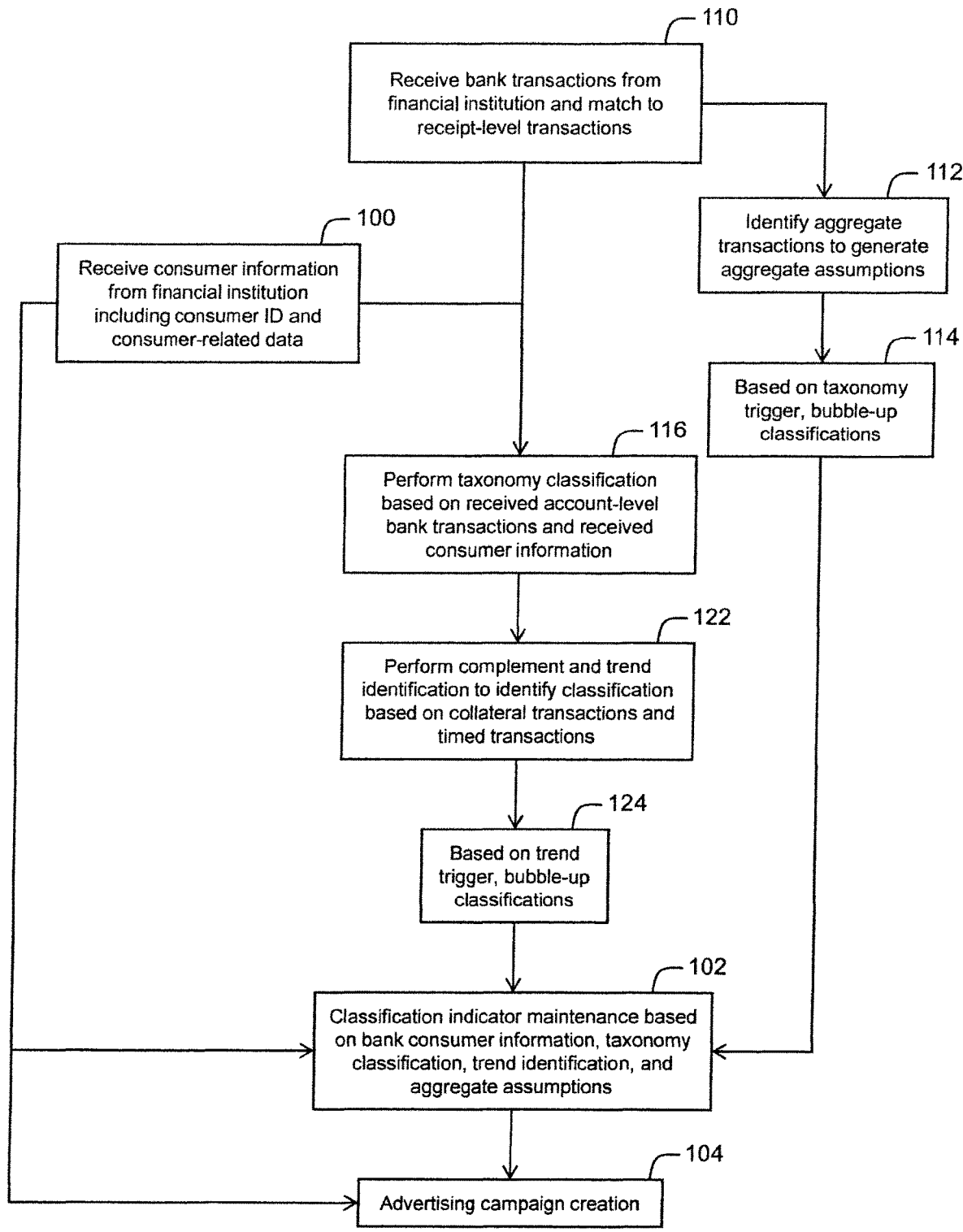
FIG. 4 is a flow diagram depicting a method for generating lifestyle indicators for consumers.

With reference now to FIG. 4, a flow chart of an embodiment of the present application is shown. It is to be understood that each of the processes in the flow chart corresponds to processing as described previously with reference to FIG. 1. Therefore, the flow chart is discussed in a block summary form, without unnecessarily repeating detail previously described. It is also to be appreciated that the flow chart is provided for understanding embodiments of the present application, however, the present application is not limited to the arrangement shown in the figure. At 100, an advertising campaign and delivery system receives bank consumer information from financial institutions, the consumer information including consumer identification and consumer related data. The consumer is identified anonymously by association with a unique customer identification code, UCIC, associated with the consumer. The received consumer information is further utilized by a classification maintenance and storage process 102 which maintains classifications for use by an advertising campaign creation procedure 104.

The received consumer information is also used by a taxonomy classification procedure 116 which determines taxonomy classification codes based on the received consumer information. The taxonomy classification, however, is additionally based on account-level bank transaction data received in 110 from financial institutions, the account-level bank transaction data including the anonymous consumer identifier and merchant identifiers and transaction data related to the transaction the consumer conducted with the merchant.

The received account-level bank transactions are further utilized by an aggregated transaction procedure 112 which identifies transactions associated with a particular consumer and aggregates them in order to generate the previously described aggregate assumptions. At 114, based on aggregation triggers, the aggregate assumptions are provided, i.e., bubbled up, in the form of classifications to the classification maintenance and storage process 102. The taxonomy classifications are further utilized by collateral and trend identification procedures at 122 to identify classifications based on collateral transactions, timed transactions, and identified trends. Further, based on triggers, key lifestyle information identified by the collateral and trend identification procedure 122 are bubbled up at 124 to the classification maintenance and storage system 102. As needed, the classifications maintained and stored by the classification maintenance and storage procedure 102 are provided to an advertising campaign creation process 104.

Figure 5:
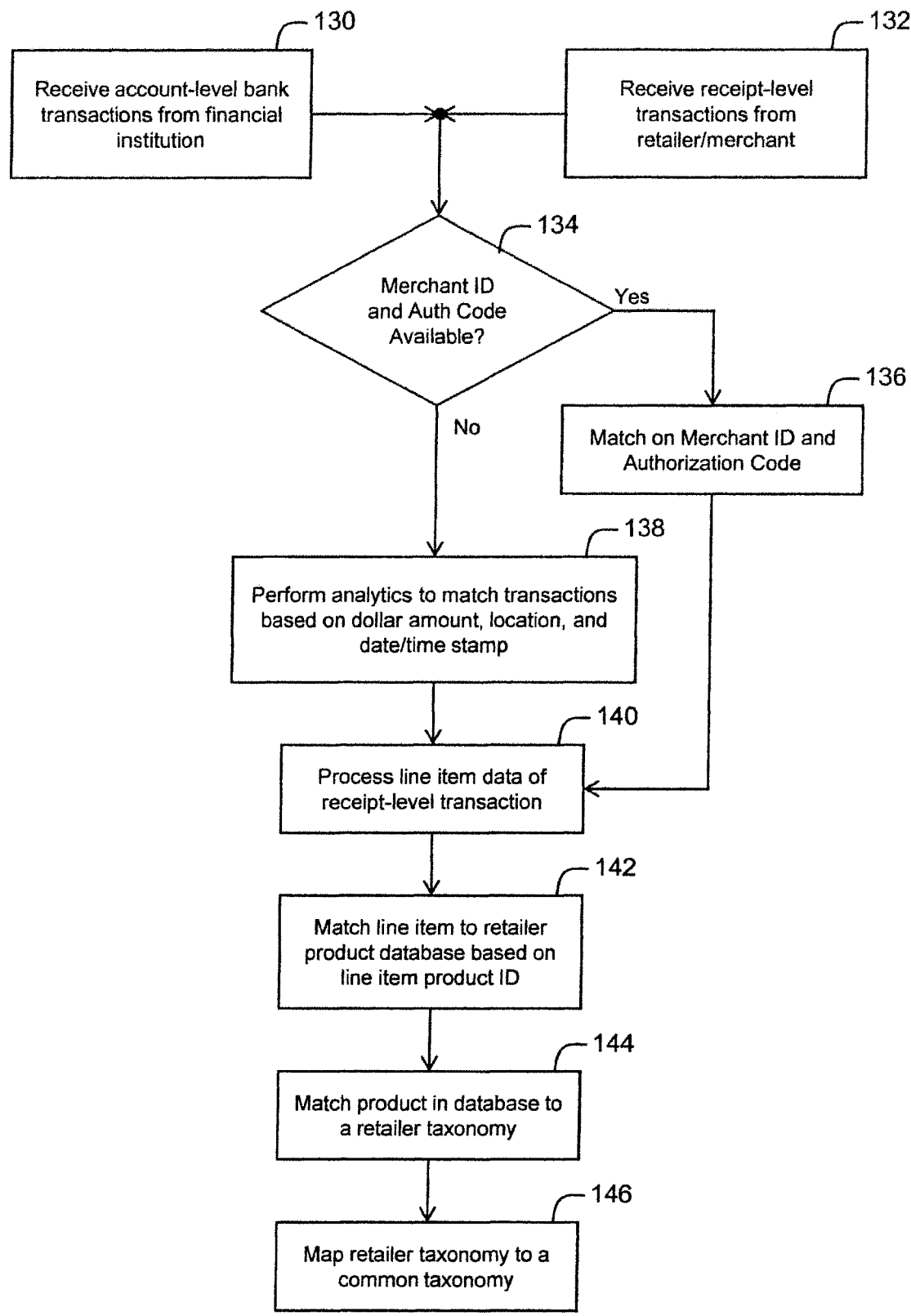
FIG. 5 is a flow diagram depicting a method for matching receipt-level retail transactions to account-level bank transactions.

With reference now to FIG. 5, a flow chart is shown describing a method of matching bank-level transactions to receipt-level transactions and identifying line item products and services in the receipt-level transaction. Account-level bank transactions are received in 130. The account-level bank transactions are received in a manner previously described with reference to FIGS. 1 and 2. It is to be understood that the system is configured to receive the account-level bank transactions through a variety of processes and in a variety of formats. For example, some financial institutions, as previously described, may have in-house export systems installed to ensure that only non-sensitive data is provided to the campaign generation. These in-house export systems can format the data into a format suitable for the campaign generation. On the other hand, some financial institutions may desire, for the sake of reduced processing overhead, to simply provide raw data to the campaign generation. In this event, the campaign generation is programmed to map the desired non-sensitive information to the requirements of the campaign generation and protect the anonymity of the financial institution customers by not accepting any personally identifiable information. It is anticipated that a variety of filter and transformation algorithms can be provided by the campaign generation in order to accommodate a variety of financial institutions, each having different requirements.

Receipt-level retail transactions are received in 132. The receipt-level transactions, similar to the account-level bank transactions, may be processed through various filters and transformations to reformat the transactions from various formats used by the various retailers into a common format utilized by the campaign generation system. It is also envisioned that retailer export systems may be installed in-house with the retailer for the purpose of formatting and/or ensuring the anonymity of the retail customers. If a merchant identification code and authorization code, as determined at 134, are available in each of the received account-level bank transactions and the receipt-level retailer transactions, the transactions can be matched based on the provided merchant identification code and the authorization code at 136. Otherwise, as previously described with reference to FIG. 2, analytic processing at 138 can be utilized to match the transactions based on, e.g., transaction dollar amount, zip code of the transaction, and a date/time stamp.

When the receipt-level retail transaction has been successfully matched to an account-level bank transaction, the individual line item details of the receipt-level transaction can now be further processed at 140. In 142, the individual line item product can be identified by matching the product ID provided in the line item entry to a retailer database utilizing the product ID as a search key. From data provided in the retailer database, at 144, the product ID can be translated into either one of a common taxonomy, an in-house retailer taxonomy, or a third party taxonomy. In the event that the product ID is matched either to an in-house retailer taxonomy or a third party taxonomy, the resulting taxonomy code can be further mapped at 146 to the common taxonomy code utilized by the advertising system.

Figure 6:
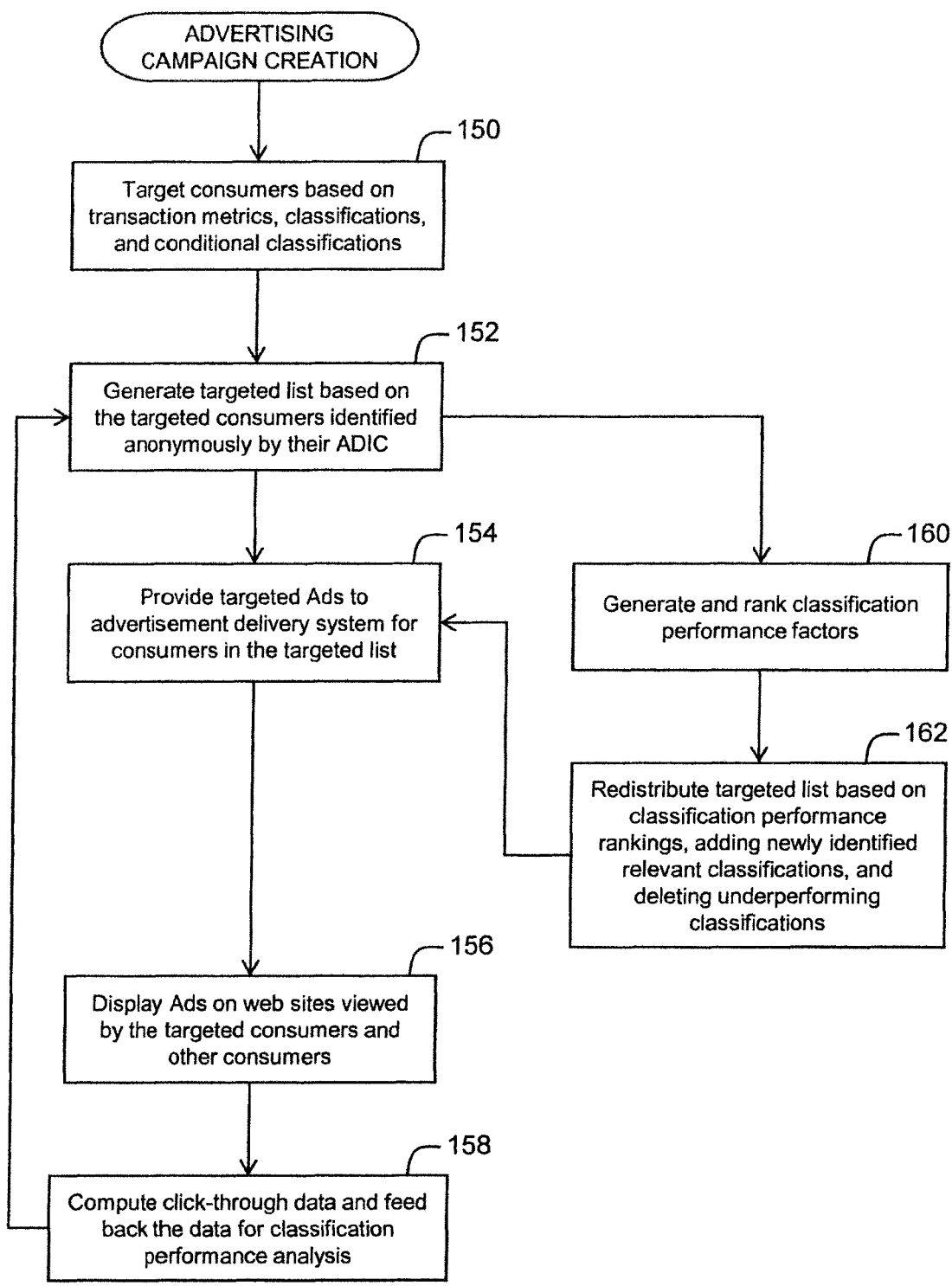
FIG. 6 is a flow diagram depicting a method for creating and updating an advertising campaign based on the classifications.

With reference now to FIG. 6, a flow chart is provided describing the advertising campaign creation procedure 104 as shown in FIG. 4. A consumer targeting 150 targets consumers based on transactional metrics computed based on the received account-level transaction data and, in some embodiments, also based on received receipt-level data received from participating merchants. Consumers are also targeted based on the stored classifications and are further targeted based on conditional classifications as previously described. At 152, a targeted consumer list is generated based on the consumers determined in the consumer targeting 150. These targeted consumers are identified anonymously by their associated ADIC or UCIC as previously described. At 154, targeted advertisements are provided to the advertisement delivery system for consumers in the targeted list. At 156, advertisements provided by the advertisement delivery system are displayed as website content viewed by the targeted consumers. Content other than advertisements can be displayed on devices that are connected to a network other than the Internet. Also at 156, advertisements can be delivered to consumers, e.g. a random set of consumers, who are not on the targeted list. At 158, the advertisement delivery system collects data related to the number of advertisements displayed and associated click-through data for performance evaluation. This performance evaluation is fed back to the targeted list generation 152 which further provides this information to a classification performance ranking 160. Here, the click-through performance related to the stored classifications is analyzed and, at 162, the targeted list is redistributed based on deletion of underperforming classifications and addition of newly identified classifications that show a high likelihood of a beneficial click-through rate. For example these new classifications can be identified from the consumers who were not on the targeted list, but received the target advertisement meant for the targeted list and clicked through the advertisement. If the ADIC is known for the random customers who clicked on the targeted advertisement, then the ADIC can be matched to the classifications in which the consumer is categorized to find new consumers in classifications that were not originally targeted by the advertisement.

Additionally, the system and method can allow an advertiser/marketer to create a broad advertising campaign and the system and method can evaluate the performance of the campaign in a similar manner to the classification performance ranking 160, above. The system will identify the best performing classifications based on the click through rate and then redistribute targeted advertisements to consumers in the better performing classifications.

The advertising campaign creation system can also be employed, with slight modifications, to restructure a web site, or other content displayed on a networked device, based on classifications in which the viewer of the content falls into. For example, if the viewer is in a classification indicating that he resides in Florida, then the weather for his region can be automatically delivered for display on the device. If recent transactions have taken place in another region of the country, then a website can deliver content, e.g. news and weather, based on that region.

The system is useful in delivering targeted content other than advertisements. Additional examples include delivering news articles, audio/visual and other content based on classifications and transactional metrics that would interest the consumer when he visits the website. For example, if the viewer of espn.com falls into the classification "golfer," then espn.com can open with a golf article as opposed to its more generic article that opens for others who visit the site. The system checks for the ADIC, which can be in the form of a persistent cookie, stored on the device that is loading and/or viewing a website, e.g. espn.com. In sum, the classifications and transactional metrics can be used to deliver content, other than advertisements, to a device. Such a system and method for delivering advertisements and content can enhance a viewer's session, e.g. on the website, which can result in the viewer wishing to return more often to view the content. The advertisements can be further personalized based on the classifications and other information that is known about the consumer. This will be described in more detail below.

Figure 7:
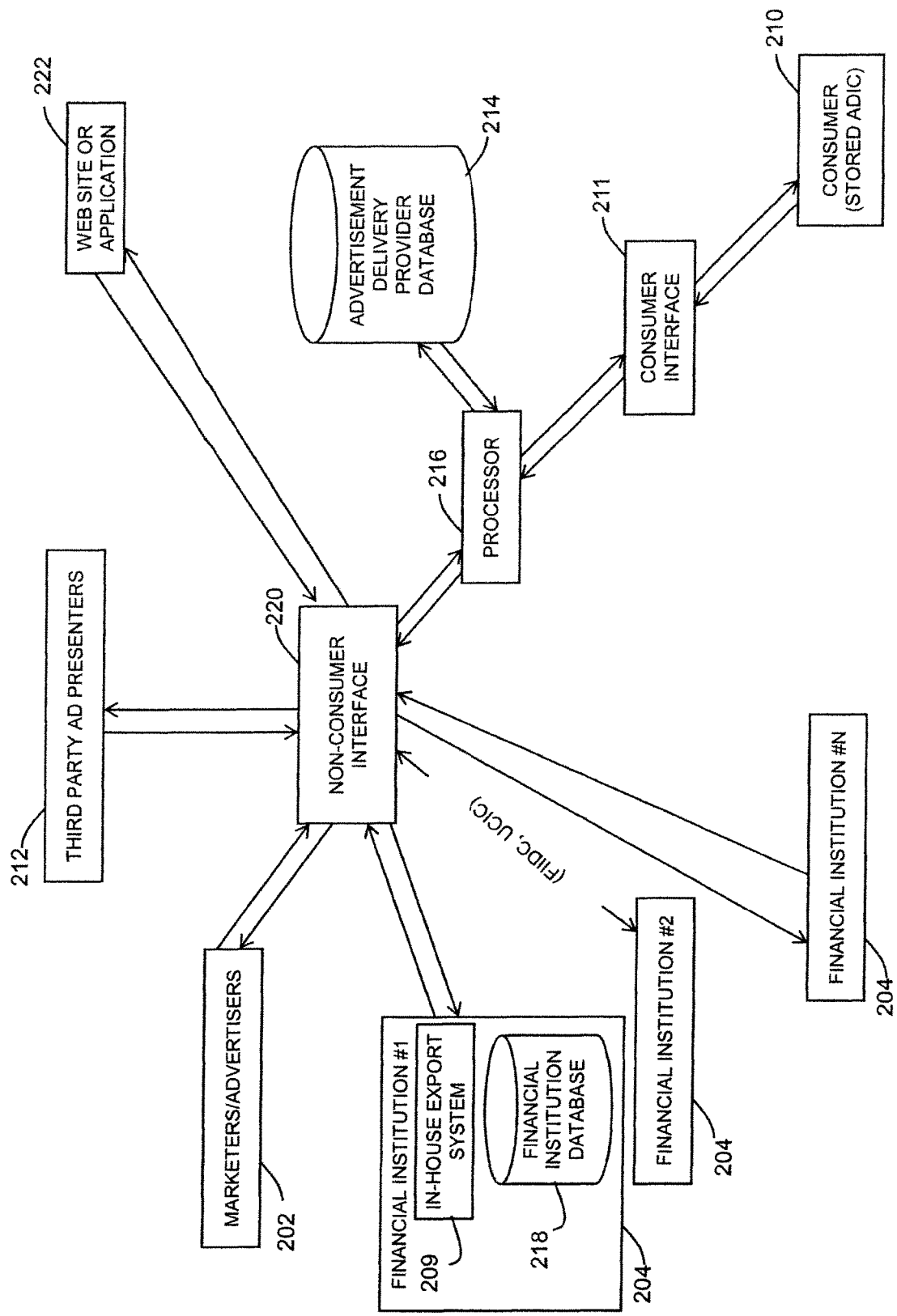
FIG. 7 is a block diagram depicting a system for generating classifications for consumers, and for creating and updating an advertising campaign based on the classifications.

With reference now to FIG. 7, the interrelationship between those who wish to deliver targeted content and those who will receive the targeted content will be described. The system allows for communication among the following individuals or entities: marketers 202, financial institutions 204 and consumers 210. The financial institutions 204 can include banks, savings and loans, credit unions, and the like. As previously described, each of the financial institutions may include an in-house export system 206 for exporting and/or filtering information and a secure database 218 (or a plurality of secure databases) that is/are operated by the financial institutions 204 that stores, or warehouses, the consumer information and financial transactions (and other financial information) of the customers of the financial institution along with other non-financial information. These financial transactions can include the debits and credits of the customers of the bank, the loans that are held by the bank for that customer, credit/debit card transactions and the like. The other information about the consumer that is stored in the financial information secure database 218 includes the consumer information such as the identity of the consumer, the age and sex of the consumer and the home zip code of the consumer. This consumer information is associated with a unique consumer identification code (UCIC) that associates the consumer to the information while still maintaining the anonymity of the consumer. By anonymity is meant that the information communicated to the advertising delivery provider precludes the provider from knowing who the consumer really is so that the "cookie", which can be later presented to the consumer, is anonymous. Accordingly, the UCIC can be referred to as an anonymous coding. For example, the UCIC is not based on the name, address, e-mail address, phone number, a government issued identification such as a social security number or the account number of the consumer at the financial institution, which can lead to the identity of the consumer becoming known.

The UCIC is tied to the financial transactions of the consumer, the age and sex of the consumer, and the zip code of the consumer; however, more personal information, such as the social security number, phone number, credit card numbers and the name of the consumer, is not associated with the UCIC, thus protecting the identity of the consumer. The UCIC codes are communicated with the consumer information through an interface or portal, referred to as a non-consumer portal 220, to the processor 216. The advertisement delivery provider database 214 associates the UCIC with the information that is similar to that stored in the financial institutions databases. The advertisement delivery provider database 214 stores, or warehouses, the financial information and other non-personal information that it receives from a number of different financial institutions. The advertisement delivery provider database 214 also associates an advertisement delivery identification code (ADIC) and a financial institution identification code (FIIDC) for each individual consumer stored in its database and associates these codes with the UCIC that is provided by the financial institution database. The ADIC is unique to each consumer stored in the database. The ADIC can also be associated with the device that is used to access content over the network, which can allow a single ADIC to be associated with more than one UCIC and FIIDC. Moreover, more than one ADIC can be associated with one UCIC. The FIIDC is associated with the financial institution that has the provided the consumer information for the unique consumer. Since the UCIC maintains the anonymity of the consumer to which it is matched, the ADIC and the FIIDC also maintain that anonymity of the consumer because no personal information is matched to these codes. Accordingly, the UCIC and the ACIC can also be referred to as anonymous codings. The ADIC is assigned by the operator of the advertisement delivery provider database 214 to the consumer 210 or to a specific device operated by the consumer and utilized thereafter in communications between the consumer 210 and the advertisement delivery provider for anonymous unique identification of the consumer. The ADIC is further communicated to the campaign generation system 216 so the system can correlate and combine data for the consumer from multiple of the financial institutions 204.

The system can also allow companies or entities that are not financial institutions to allow for the delivery of advertisements on their web sites or other communication platform—these entities will be referred to as third party advertisement presenters 212. The marketers 202 are companies or individuals who wish to deliver targeted advertisements to targeted consumers 210. The consumers 210 are also customers of at least one of the financial institutions 204 that share information within the system. The consumer information, e.g., birth date, zip code, etc., and consumer account-level transaction data, which is provided by the financial institutions, is used to determine classifications stored in an advertisement delivery provider database 214 maintained by a campaign generation system 216 operated by the advertisement delivery provider. The third party advertisement presenters 212 operate web sites or other publication outlets that are not affiliated with the any of the financial institutions (or are unsecure web sites that are operated by the financial institutions) that allow for the delivery of advertisements. The system is designed to maintain the anonymity of the consumers while allowing the marketers to have their advertisements delivered to consumers who fall within their defined market segment. Additionally, the system allows for communication to the third party advertisement presenters 212 (or other third party publishers of content) to receive messages that instruct the presenter 212 to publish content based on at least one of the classifications associated with the consumer viewing the webpage.

Generally the system incorporates an embodiment of the methods described with reference to FIGS. 4-6. The targeted advertisements based on the classifications of the consumers 210 are delivered to the consumer when the consumer visits websites 222 (or other publication displays or applications) having an association with the financial institutions 204 or third party advertisement presenters 212. The targeted content, one example being advertisements, can be delivered either directly to the consumer 210 or via the visited websites or other applications 222. It is intended that the advertisement be able to be delivered to any device, e.g. computer, mobile phone, television set, that is able to store a persistent cookie, or other persistent unique identifier. However, if an advertisement is being displayed on a secure application operated by a financial institution, targeted content can be delivered without having to set a persistent cookie.

Figure 9:
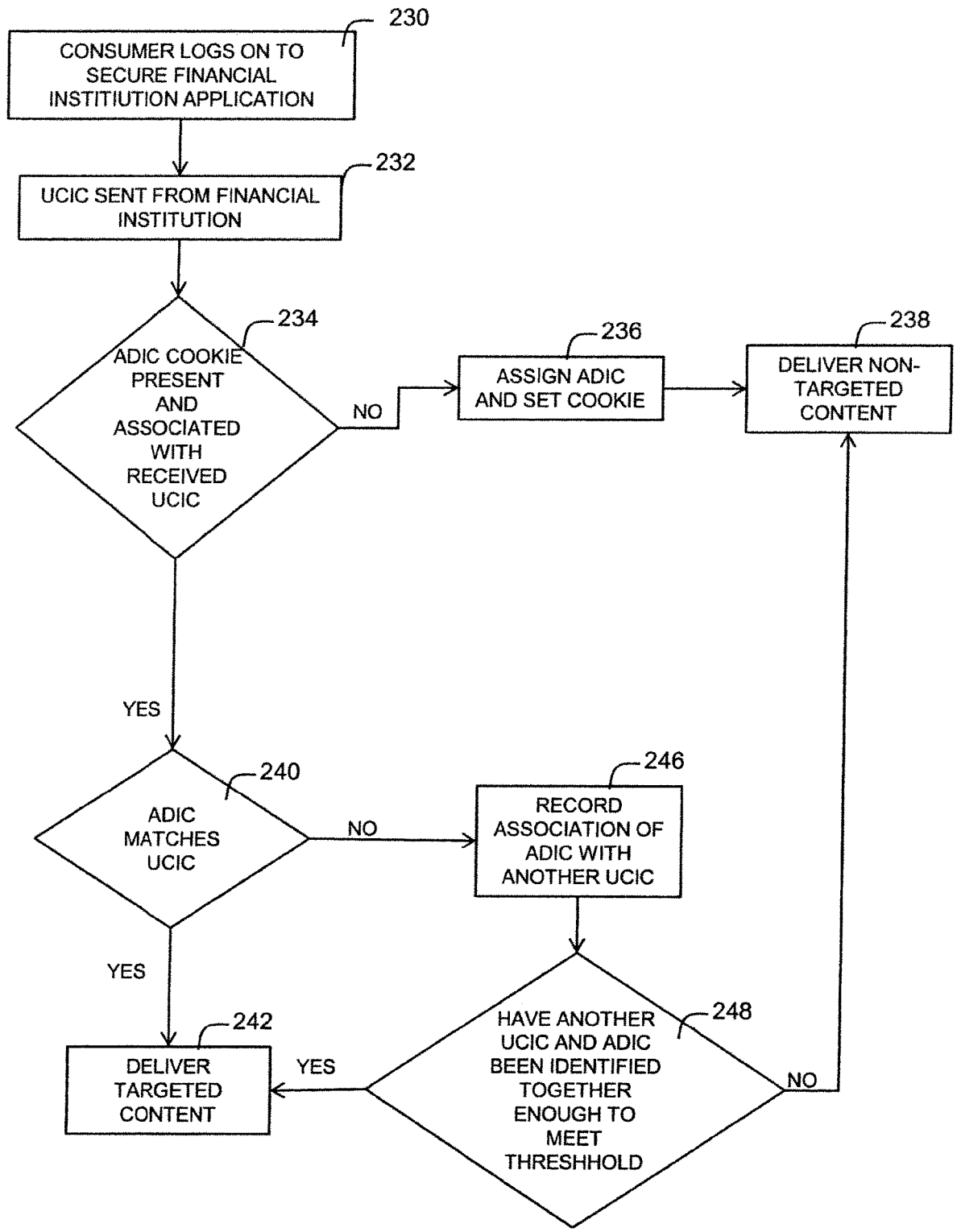
FIG. 9 is a flow diagram depicting a method for delivering targeted content to a networked device.

With reference to FIG. 9, at 230 the content viewer, who is also a customer of one of the financial institutions, logs onto the financial institution's website or securely enters an application that is operated by or associated with the financial institution. The consumer logs onto a protected portion of the financial institution's website or application where the consumer must identify himself appropriately so that, for example, the financial institution allows the user to perform banking transactions over the Internet or other network. At 232, the financial institution passes the UCIC associated with the content viewer from the financial institution to the processor 216 (FIG. 7) operated by the advertisement delivery provider, which has also been referred to as the targeted content provider. At 234, the targeted content provider associates and ADIC with the received UCIC. The advertisement delivery provider can check the advertisement delivery provider database 214 (FIG. 7) for an ADIC associated with the received UCIC. If no ADIC is associated with the received UCIC, then at 236 the advertisement delivery provider can assign an ADIC to this device and set a cookie on the device that includes the ADIC or other similar identification. Since an ADIC has not been associated with this device, or this device has erased previous cookies including the ADIC, not enough information is known about this device to send targeted content, e.g. an advertisement for display on the device. Accordingly, at 238 a non-targeted advertisement can be delivered at this time to the device.

With reference back to 234, if an ADIC is associated with the received UCIC and the ADIC cookie is present on the device, then at 240 the advertisement delivery provider checks to see if the ADIC cookie that is present on the device matches the UCIC that is associated with this ADIC. If the ADIC matches the UCIC, then enough information is known about this device to send targeted content, because the financial information associated with the UCIC can be used to determine the classifications into which the consumer using the device falls into. Accordingly, at 242 a targeted ad, or other targeted content, can be delivered to the device.

With reference back to 240, if the ADIC cookie stored on the device does not match the UCIC associated with that ADIC, then at 246 the advertisement delivery provider can record the association of the ADIC stored on the device (via the persistent cookie that has been previously set) with another UCIC. This can happen for example, where the device is used to log onto two different financial institution applications. When logging into the first financial institution application, the advertisement delivery provider can assign an ADIC associated with the UCIC from the first financial institution. If this device is then used to log onto another secure application of another financial institution, then an ADIC will have already been stored on the device, but the UCIC from the new financial institution will not match the previously received ADIC. After recording the association of the ADIC with the another (different) UCIC stored at 246, then at 248 the advertisement delivery provider can query whether the another (different) UCIC and the ADIC have been identified together enough to meet a threshold. If this another (different) UCIC and the stored ADIC have been identified together enough to meet a threshold, then enough information is known about the device to associate this another UCIC with the ADIC, therefore a single ADIC can now be associated with two UCICs and the financial information from two different financial institutions can be associated with one content viewer or device operated by a content viewer. Accordingly, enough information is known about the content viewer using this device that a targeted advertisement can be delivered. If the UCIC and the ADIC have not been identified together enough to meet a threshold, then a non-targeted advertisement can be delivered.

Analytics can be used to determine whether the device that is being used is a public computer. For example, if many different UCICs are associated with the same ADIC, then an assumption can be made that this device is being used by members of the general public and therefore general advertisements can be delivered to this device. However, if the same UCICs and the ADIC have been associated together many times, it is likely that this device is used by the same person who is a customer of different financial institutions. Accordingly, the financial information available from these different institutions can be associated with the same ADIC. The analytics used to determine whether the UCIC and the ADIC have been identified together enough to meet a threshold will depend on the account type. For example, a consumer will likely not check the financial institution's application where the financial institution holds a car loan for the consumer as often as the consumer will check his or her checking account. Accordingly, the UCIC associated with the car loan account, may not have to be associated with the same ADIC as much as a checking account would in order to meet the threshold described at 248.

Figure 10:
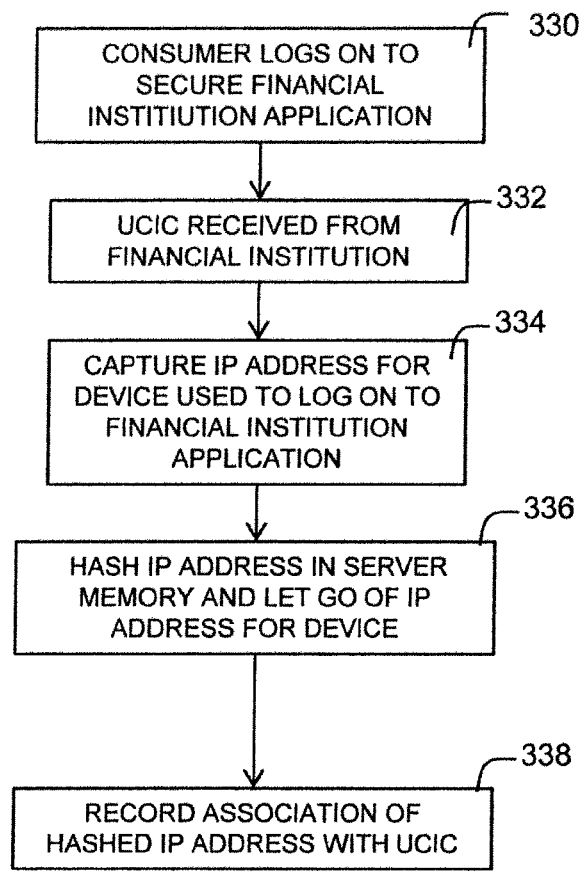
FIG. 10 is a flow diagram depicting a method for recording a hashed IP address.
Figure 11:
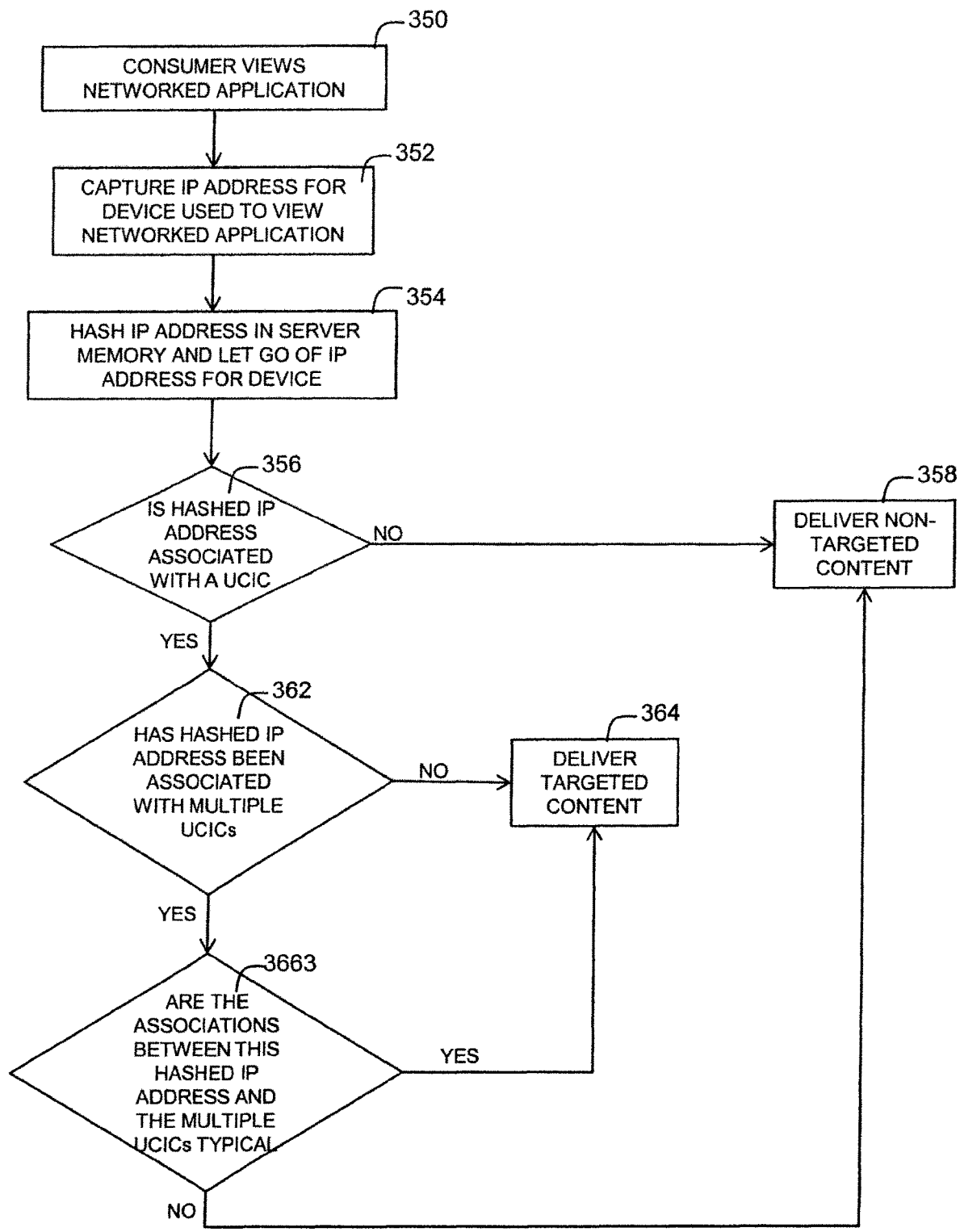
FIG. 11 is a flow diagram depicting another method for delivering targeted content to a networked device.

FIG. 9 depicts one method for delivering targeted content to a device over a network. FIG. 9 describes how the method includes identifying a consumer who is viewing content based on a unique identifier stored on the device used by the consumer to view the content. For the method described in FIG. 9, the unique identifier is a persistent cookie that can be set on the device used by the consumer to access the content. FIG. 11 depicts another method for delivering targeted content to a device over a network and also employs a unique identifier associated with the device used by the consumer to view the content. FIG. 10 describes a method for associating the unique identifier with the financial information of the consumer who uses the device.

With reference to FIG. 10, at 330 the content viewer, who is also a customer of one of the financial institutions, logs onto a website or other application that is operated by the financial institution. The consumer logs onto a protected portion of the application where the consumer must identify himself appropriately so that, for example, the financial institution allows the consumer to perform banking transactions over the network. At 332, the financial institution passes the UCIC associated with the content viewer who has just logged into the secured financial institution application to the targeted content provider. Another way of stating this is that the targeted content provided receives the UCIC. In this example, the UCIC is passed to the processor 216 (FIG. 7) operated by the advertisement delivery provider. At 334, the advertisement delivery provider captures the IP address for the device used to log onto the secure financial institution application. To protect the identity of the consumer who is using the device to view the secure portion of the financial institution application, the IP address is hashed using a cryptographic hash function, e.g. MD5 and SHA-1. The IP address can only remain temporarily in the server memory of the advertisement delivery provider, and then be let go from the memory of the advertisement delivery provider's server. To further protect the identity of the user of the device, the IP address may not be written to a disk or stored in a database operated by the advertisement delivery provider. The hash value for the IP address, also referred to herein as the hashed IP address, can be the only identification associated with the device that is stored by the advertisement delivery provider. Since it can be extremely difficult or nearly impossible to calculate a text, e.g. the IP address, which has a given hash the IP address for the device used to access the secure application of the financial institution is not known to the advertisement delivery provider. At 336, the hashed IP address is stored in a database operated by the advertisement delivery provider and at 338, the association of the hashed IP address with the UCIC received from the financial institution is recorded. Accordingly, the device that is used by the operator can be matched with the financial information of the operator, but the IP address of the device used by the operator remains anonymous or unknown to the targeted content delivery provider due to the hashing of the IP address. In addition to cryptographic hashing, other encryption functions and algorithms can be applied to an IP address so that the IP addresses used to access financial institution applications are not stored on the server of the advertisement delivery provider.

FIG. 11 depicts a method for delivering targeted content to a device over a network using the hashed IP address of the device used to access the network. At 350, the consumer views a networked application, e.g. a website (the website need not be associated with a financial institution). At 352, the advertisement delivery provider captures the IP address for the device used to view the networked application. At 354, the IP address is hashed, e.g. subjected to a cryptographic hash function, and let go from a server operated by the advertisement delivery provider. Similar to what has been described above, in this example the IP address is not written to any database or disk under the control of the advertisement delivery provider.

At 356, the advertisement delivery provider determines whether the hashed IP address is associated with a UCIC stored in its database. If the hashed IP address is not associated with a UCIC in the database of the advertisement delivery provider, then at 358 not enough information is known about the operator of the device to deliver targeted content and therefore non-targeted content is delivered to the device. If however, the hashed IP address is associated with a UCIC at 356 then at 362, the advertisement delivery provider determines whether the hashed IP address has been associated with multiple UCICs. For example, for the device that is being used to access the networked application may be a public computer and many different UCICs can be associated with the same hashed IP address. Analytics can be used to determine whether the device that is being used to access the networked application is a public computer. For example if many different UCICs are associated with the same hashed IP address, then an assumption can be made that this device is used by members of the general public.

At 362 if the hashed IP address has not been associated with multiple UCICs, then enough information is known about the operator of the device, since a single hashed IP address has been matched to a single UCIC, and therefore the financial information associated with the consumer that matches the UCIC can be associated with the hashed IP address. This allows for targeted content to be delivered to the device at 356. If, however, the hashed IP address has been associated with multiple UCICs at 362, then at 366 the advertisement delivery provider determines whether the associations between this hashed IP address and the multiple UCICs is typical. For example, if the same device is being used to check a mortgage, a car loan, a checking account, and a savings account, then all of these accounts may be owned by the same individual and it can be assumed that the individual who is operating the device that is checking these accounts is the owner of each of these accounts. Accordingly, the financial information associated with each of these accounts can be tied back to a unique identifier for the consumer, e.g. the hashed IP address of the device, and targeted content can then be delivered to that device at 364. However, if the associations between this IP address and the multiple UCICs are not typical, for example hundreds of different checking accounts have been associated with the same IP address, then this device associated with this IP address may be used by the general public and therefore the delivery of targeted content based on financial information of one of the consumers who operates the device would be difficult. Accordingly, non-targeted content can be delivered at 358.

Figure 8:
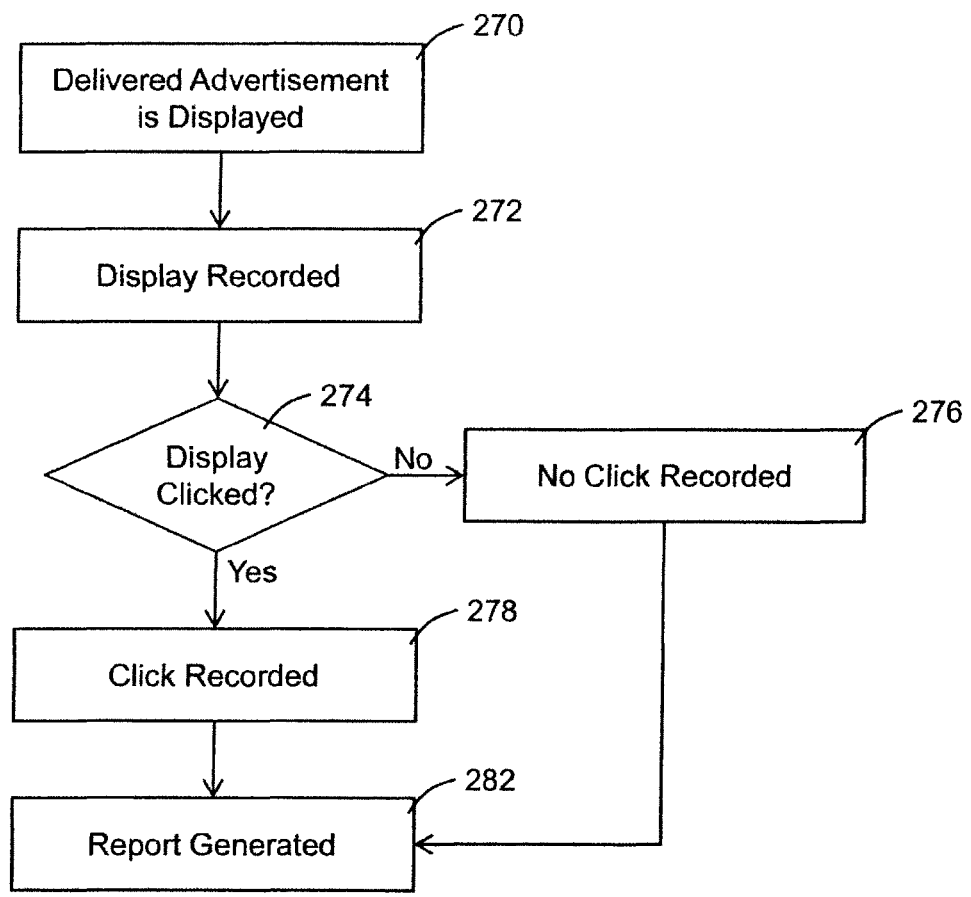
FIG. 8 is a block diagram depicting a method for generating a personalized advertisement.

With reference to FIG. 8 an advertisement can be personalized to the consumer by augmenting a base advertisement 300, which is based on the product or service that is being offered by the marketer or advertiser, with an augmentation 302 that is based on the classifications, the bank consumer information, the account type information or the bank transaction information to deliver a blended advertisement 304. An augmentation of a base advertisement for a car will be provided as an example. For example, if the consumer falls into the "golfer" classification and the advertisement that is to be delivered is for a car, then an image of the car that is being advertised can be superimposed onto an image of a golf course. The blended advertisement 304, which is this example is the car superimposed on a golf course, is then delivered to the consumer's device, e.g. computer, mobile phone, or other device that is able to store a persistent cookie. Another manner of stating the personalization of an advertisement is that a portion of the content of an advertisement is based on the classification or other information that is known about the customer. The superimposition of one image, e.g. the car, over another image, e.g. a golf course, would result in separate images appearing to the viewer of the advertisement as a single image, which is made up of the two images blended together.

The selection of the image that is based on a classification, i.e. the augmentation 302, need not directly correlate to the classification in which the consumer is categorized. For example, the background color, which would be the augmentation, of the blended advertisement may be determined by a classification of the viewer of the advertisement. For example, a green background can be chosen for an advertisement of a product to persons who are in a classification "environmentalist" even though the product may not be associated with the environment, e.g. a computer.

Moreover, the multiple classifications that the consumer viewing the advertisement falls into can be weighted to determine the content of the advertisement. For example, where the consumer is classified in both the "golfer" classification and the "grandparent" classification, the content of the augmentation, e.g. the background image of the advertisement, can be a function of values given to different classifications. Values can be assigned to certain classifications so that if the consumer falls into different classifications, then the classification having the higher value is matched to the content for the advertisement. In the example of a car advertisement, the "golfer" classification can be assigned a higher value than the "grandparent" classification so that an image associated with a golfer is displayed along with the advertisement as opposed to an image associated with a grandparent.

The content of the advertisement can also include audio or video content that is based on the classification of the consumer viewing or listening to the advertisement. For example, with reference back to a car advertisement, audio content can be tailored so that consumers falling into the classification "college student" hear music popular on college radio stations and consumers falling into the classification "orchestra attendee" hear classical music, but the same car would be viewed for each advertisement.

The content of the advertisement can also be a function of the retail transaction data 33 (FIG. 2) for a specific consumer. For example, if it is known that a consumer recently purchased brand X coffee, then an advertisement for brand Y coffee can be delivered to the consumer. Similarly, the retail transaction data can be helpful in delivering timely and geographically relevant advertisements. For example, if it is known that a consumer recently paid for a dinner at a restaurant, then advertisements can be delivered to the consumer's mobile device for desserts and other complementary products, e.g. coffee or movie tickets, for locations near the restaurant where the consumer dined. This technology allows for these timely delivery of advertisements without the need for global positioning devices to know the location of the consumer—instead the receipt level data, which shows the location of the restaurant can provide the geographic information needed to provide the geographically relevant advertisement.

The content of the advertisements delivered can also be more specifically based on the account type information 13 (FIG. 1) for the individual receiving the advertisement. For example, if it is known that the viewer of the advertisement has a car loan that is about to be paid off, e.g. there are less than about three or four car payments remaining on an installment loan, then the advertisement that is delivered to the viewer can include information about the current loan and an offer for a new car. For example, the advertisement can read: "You have three payments remaining for $356.75 per month for your 2004 Honda Accord, we can get you into a 2009 Acura TL for $415 per month."

The content of the advertisements can also include offers for products and services from different marketers within the same advertisement. For example, the advertisement, "You have three payments remaining for $356.75 per month for your 2004 Honda Accord, we can get you into a 2009 Acura TL for $415 per month," can involve a car dealership and a bank partnering together to offer the car and an installment loan.

The content of the advertisements delivered can also be based on bank transaction data 10 (FIG. 1). For example, if the bank transaction data indicates that a consumer is paying $100 per month to natural gas provider X, then an advertisement that can be delivered to the consumer that includes information about this data. For example, an advertisement delivered to the viewer can read: "You pay $100 per month for natural gas to company X, switch to company Y and pay $80 per month."

Figure 12:
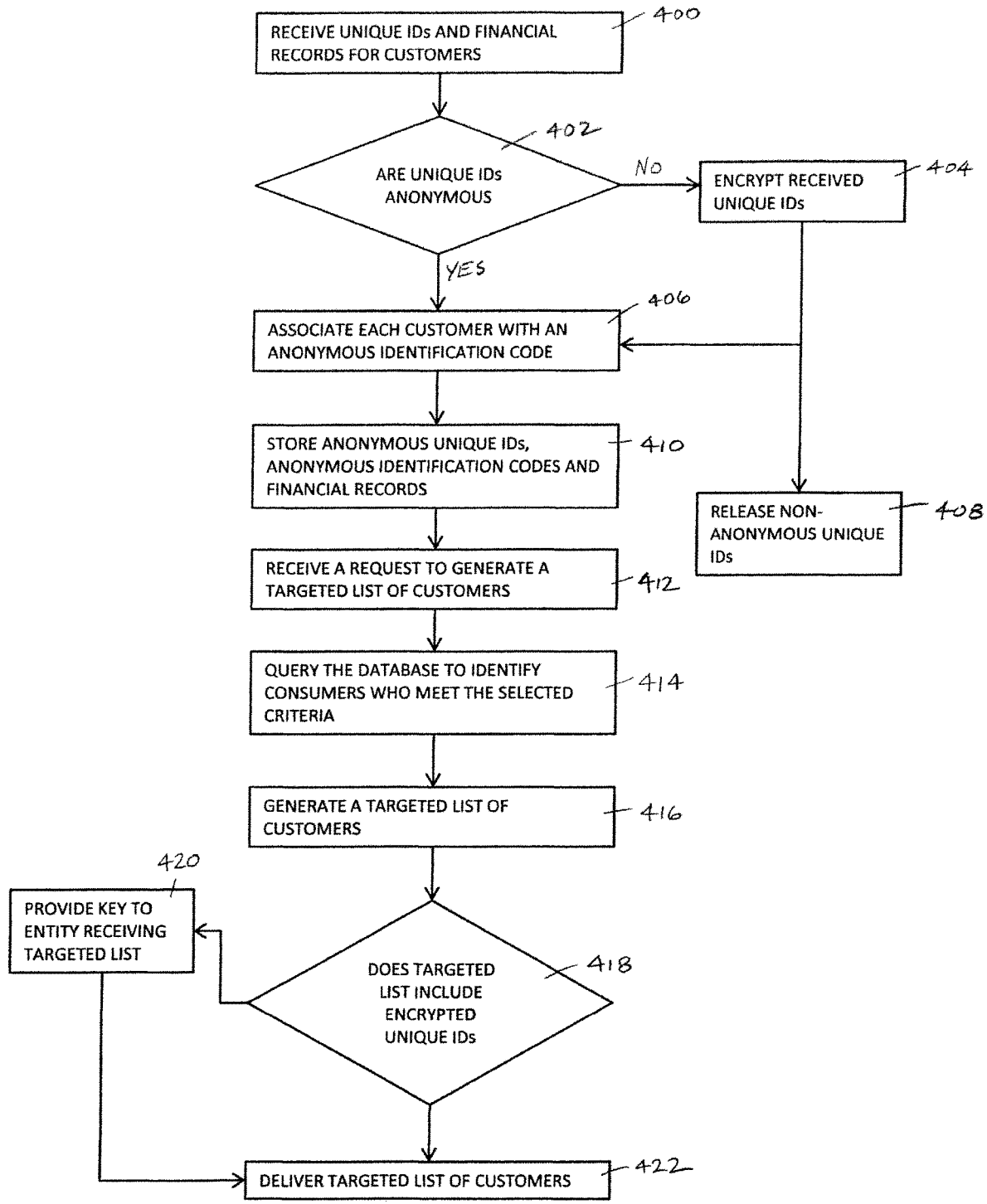
FIG. 12 is a flow diagram depicting a method for processing a list of customers to receive targeted content.

With reference to FIG. 12, an example of a method for processing a list of customers to receive targeted content is shown. At 400 financial records for customers of at least one financial institution are received. The financial records will typically be received as batch data files delivered over a computer network. This is explained above with reference to FIGS. 1 and 2 where the financial records can include bank customer information (also referred to as bank consumer information above), which can be anonymous demographic data about a customer as an individual such as, e.g. birth date, gender, zip code, etc. The received financial records can also include bank account type information, which can include a type of account held by the consumer, e.g., savings, checking, mortgage, IRA, credit card account, asset loan, etc. This bank account type information can also include information related to each account, as applicable, such as inception date, terms for mortgages or certificates of deposit, payment amounts for mortgages or other loans, and so forth. This bank account type information need not include the account number for the customer, which can further protect the privacy of the customer. The financial records can also include bank transaction data, which can describe individual transactions conducted by the customer such as, e.g., a credit/debit card purchase at a retail location.

At 400, unique identifications ("IDs"), which can be assigned by the financial institution that is providing the financial records, can also be received. These unique IDs can be similar to the UCIC described above. These unique IDs received at 400 can be anonymous in that the financial institution customer who is associated with the unique ID may not be identified by the received unique ID, e.g. the unique ID is not associated with a name, a bank account number, a street address, an e-mail address, a social security number or a phone number for the respective customer. Alternatively, the unique ID may be non-anonymous.

At 402, a determination is made as to whether each unique ID that has been received is anonymous. As mentioned above, the financial institution may deliver the financial records for its customers where the financial information is associated with a unique ID that is not anonymous. If the received unique IDs are not anonymous, then at 404 these non-unique IDs can be encrypted. Known encryption software can be used to encrypt the non-unique IDs. If the unique IDs are anonymous, then at 406 the received financial records of each consumer can be associated with an anonymous identification code, where each anonymous identification code is representative of a respective consumer. The anonymous identification codes, which can be similar to the ADICs (described above), can be assigned by the system, and more particularly by software running on the processor 216 in FIG. 7.

With reference back to 404 where the unique IDs are encrypted, the processor 216 depicted in FIG. 7 can also include software to encrypt the non-anonymous unique IDs that have been received by the processor. At 408, the non-anonymous received unique ID can be released where the non-anonymous unique ID is not written to any database or memory under the control of the operator of a database that stores the financial records and the anonymous identifiers that are representative of the customers. The encrypted unique ID, since it is now anonymous, can be associated with the consumer's financial records and operate similar to an ADIC, which has been described above. In other words, at 406 an ADIC can be associated with each anonymous UCIC provided by a financial institution, or the encrypted UCIC, which is now anonymous, can be associated with the financial records of the consumer that was once represented by a non-anonymous UCIC.

The system in FIG. 7 (or another similar system) can also match a customer who has different accounts at different financial institutions to the same anonymous identification code. For example a consumer, who will be referred to as a multi-financial institution customer, can have accounts at different financial institutions. The database can receive financial records for a multi-financial institution customer where the multi-financial institution customer is a customer of at least two different financial institutions. Software and/or hardware on the processor 216 (FIG. 7) can associate the received financial records from a first financial institution with a first anonymous identification code, e.g. a first ADIC. Software and/or hardware on the processor 216 (FIG. 7) can also associate the received financial records from a second financial institution with a second anonymous identification code, e.g. a second ADIC. The system can be configured to track financial transactions where the multi-financial institution customer transfers money between the first financial institution and the second financial institution. Based on having tracked a predetermined number of financial transactions where the multi-financial institution customer transfers money between the first financial institution and the second financial institution, the system can identify the multi-financial institution customer represented by the first anonymous identification code and the multi-financial institution customer represented by the second anonymous identification code to be the same customer. Accordingly, this multi-financial institution customer can be represented by the same ADIC, e.g. either the first ADIC or the second ADIC, or a newly generated ADIC.

At 410, the anonymous unique IDs, the anonymous identification codes and the financial records are stored in a database, such as the database 216 depicted in FIG. 7. With reference to the embodiments described above, the ADICs and the UCICs can be stored along with the financial records of the consumer. These can be stored in a database, such as the database 214 depicted in FIG. 7.

At 412, a request can be received to generate a targeted list of consumers who meet selected criteria. This has been described with much detail above. For example, a financial institution may be interested in directing targeted content, e.g. advertisements, to consumers who are in the market for a home equity loan. This request can be received from entities including the following: marketers/advertisers 202 (FIG. 7), financial institutions 204 (FIG. 7) or even third party ad presenters 212 (FIG. 7).

At 414, the database is queried to identify consumers based on the selected criteria and the associated financial records associated with each consumer. This has been described in much detail above. For example, the consumers based on the financial records can be classified into classifications, e.g. "student," "grandparent," or even "individual likely to require a home equity loan." These classifications can be generated using the methods and systems described above; therefore, further explanation as to how to identify consumers who meet selected criteria is not provided.

At 416, the numerous amount of data stored in the database is transformed into a targeted list of customers based on the consumers identified when querying the database and each consumer's corresponding financial records. The possibly millions of stored anonymous identification codes and the accompanying financial records stored in the database can provide the basis upon which a targeted list of customers can be generated where customers meet the selected criteria. The targeted list of customers identify each customer using an anonymous identifier that is representative of a consumer of the at least one financial institution but does not personally identify the consumer. The generated targeted lists can be stored in the database, or the generated targeted lists can be displayed, e.g. printed on paper or displayed on a computer screen. This transformation of numerous financial records for numerous consumers into a list of consumers who are an appropriate audience for highly targeted content is very useful to publishers of such content. For example, publishers of content other than advertisements can tailor content, e.g. news articles, instructional manuals, to individuals based on the lifestyle of the individual, which can be deduced from the financial records for that individual.

At 418 it is determined whether the targeted list that was generated at 416 includes any encrypted unique IDs. If the targeted list includes encrypted unique IDs, then at 420 a key is provided to the entity receiving the targeted list. This key allows the entity receiving the targeted list to match the encrypted unique ID to a non-anonymous unique ID by which the consumer can be identified by the entity receiving the targeted list. The targeted list of customers is then delivered at 422. This targeted list of customers can be used as an audience to provide targeted content. The targeted content is not limited to only delivery via the internet or over another network. For example, if the entity that receives the targeted list knows the residential address of the consumer, postal mail can be delivered to the consumer that includes the highly targeted content. Moreover, if the entity that receives the targeted list knows the phone number of the consumer, a telephone call can be made to the consumer on the list. The entity that generates the targeted list at 416, however, never knows the identity of the consumer.

A system for processing a list of customers to receive targeted content can include the system that was described above and is more clearly depicted in FIG. 7. The system can include a database, such as database 214 shown in FIG. 7, which stores anonymous unique identifications for a plurality of customers of at least one financial institution. The database can also store financial records for the customers. As described above, each anonymous unique identification can be representative of a customer of the at least one financial institution and be associated with the financial records for the respective customer. The system can also include a processor, similar to the processor 216 shown in FIG. 7. The processor can include software configured to classify the customers into selected classifications based on the financial records associated with each anonymous unique identification. The processor can also be configured to create a list of targeted content viewers based on at least one selected classification. The list can include at least one anonymous unique identification associated with the at least one selected classification. Since the system has been described above in more detail, further description of the system for processing a list of financial institution customers for receiving targeted content is not provided.

Figure 13:
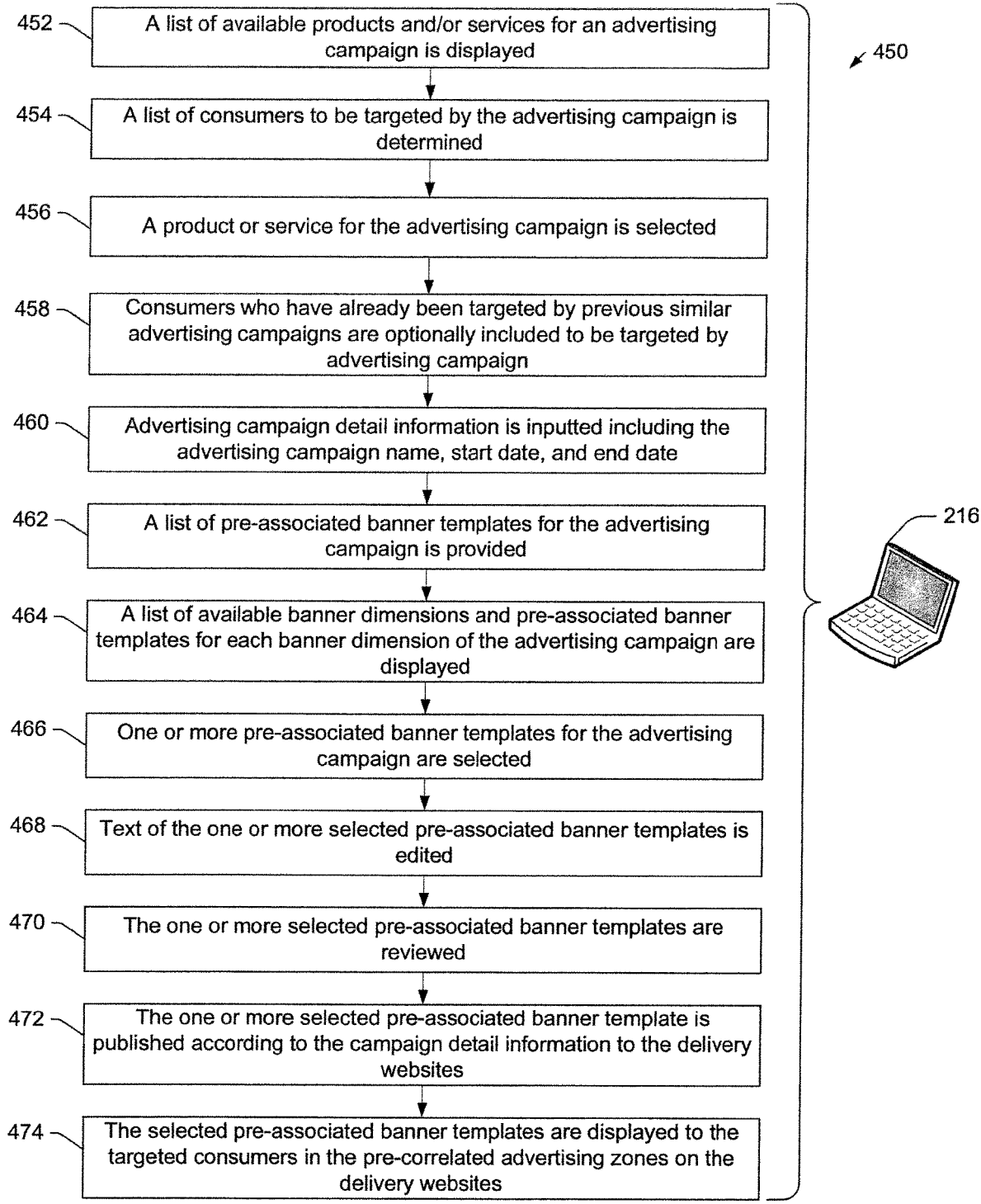
FIG. 13 illustrates a method for creating a customized advertising campaign.

FIG. 13 illustrates a method 450 for creating a customized advertising campaign. The method utilizes the above analytics to anticipate consumer spending patterns and assists in the delivery of customized advertising campaigns on various public and private websites. Specifically, the method enables the creation of customized online product and service advertising campaigns which automatically target the advertising campaign, create one or more associated banners ads, and assign the website delivery locations in a quick and efficient manner. Currently, the process of creating a customized advertisement campaign requires multiple processes including determining a list of customers to be targeted, creating custom artwork for banner ads, and determining locations in which place the advertising campaigns are placed. In some cases, this process can take more than three months.

Method 450 provides a new and improved process for creating customized advertising campaigns which over the above-referenced problems. The method 450 is executable by a processor 216 and the like. At 452, a list of available products and/or services for an advertising campaign is displayed to a user. The list of selectable products and/or services for the advertising campaign may be a function of key lifestyle indicators (KLIs) (i.e., classifications) generated by the herein-described analytics. For example, the KLIs or classifications are useful for targeting advertisements as described above. At 454, a list of consumers to be targeted by the advertising campaign is determined. The list of targeted consumers is determined utilizing the above analytics to anticipate interest in the available products and/or services. At 456, a product or service for the advertising campaign is selected by the user. At 458, consumers who have already been targeted by previous similar advertising campaigns are optionally included by the user to be targeted by advertising campaign. For example, the analytics determine which consumers have been targeted in the past by similar advertising campaigns which were not previously included in the list of customers to be targeted by the advertising campaign. At 460, advertising campaign detail information is inputted by the user including the advertising campaign name, start date, and end date. The advertising campaign start date and end date provide the time period the advertising campaign is delivered on the delivery websites.

At 462, a list of one or more pre-associated banner templates for the advertising campaign is provided. The pre-associated banner templates are based on the selected product or service and advertising zones on the delivery websites. For example, banner templates and advertising zones are pre-correlated for each of the available products and/or services and stored in a database. After the user selects a product or service for the advertising campaign, one or more banner templates are pre-associated with the selected product or service and available advertising zones and displayed to the user. At 464, a list of available banner dimensions and pre-associated banner templates for each banner dimension of the advertising campaign are displayed to the user. For example, each of the delivery websites includes one or more advertising zones representing an available banner dimension for the zone. Each of the advertising zones dictates the available banner dimensions and the selected product or service dictates the advertising campaign banner templates. The dictated banner templates are associated with each available banner dimension and displayed to the user. At 466, one or more pre-associated banner templates for the advertising campaign are selected by the user.

At 468, text of the one or more selected pre-associated banner templates is edited by the user. For example, the pre-associated banner templates include HTML format text which is editable by the user to customize the banner. This enables the user to view the customized banner as if it were being displayed on the delivery website. At 470, the one or more edited selected pre-associated banner templates are reviewed by the user. At 472, the one or more selected pre-associated banner templates are published according to the campaign detail information to the delivery websites. For example, the selected pre-associated banner templates including HTML text are converted to an image format (JPEG, TIF, PNG, GIF, and the like) for delivery. At 474, the selected pre-associated banner templates are displayed to the targeted consumers in the pre-correlated advertising zones on the delivery websites. For example, status information relating to the advertising campaign is determined based from the starting and ending date of the advertising campaign. Advertising campaigns having an active status are delivered to consumers on the delivery websites.

Figure 14:
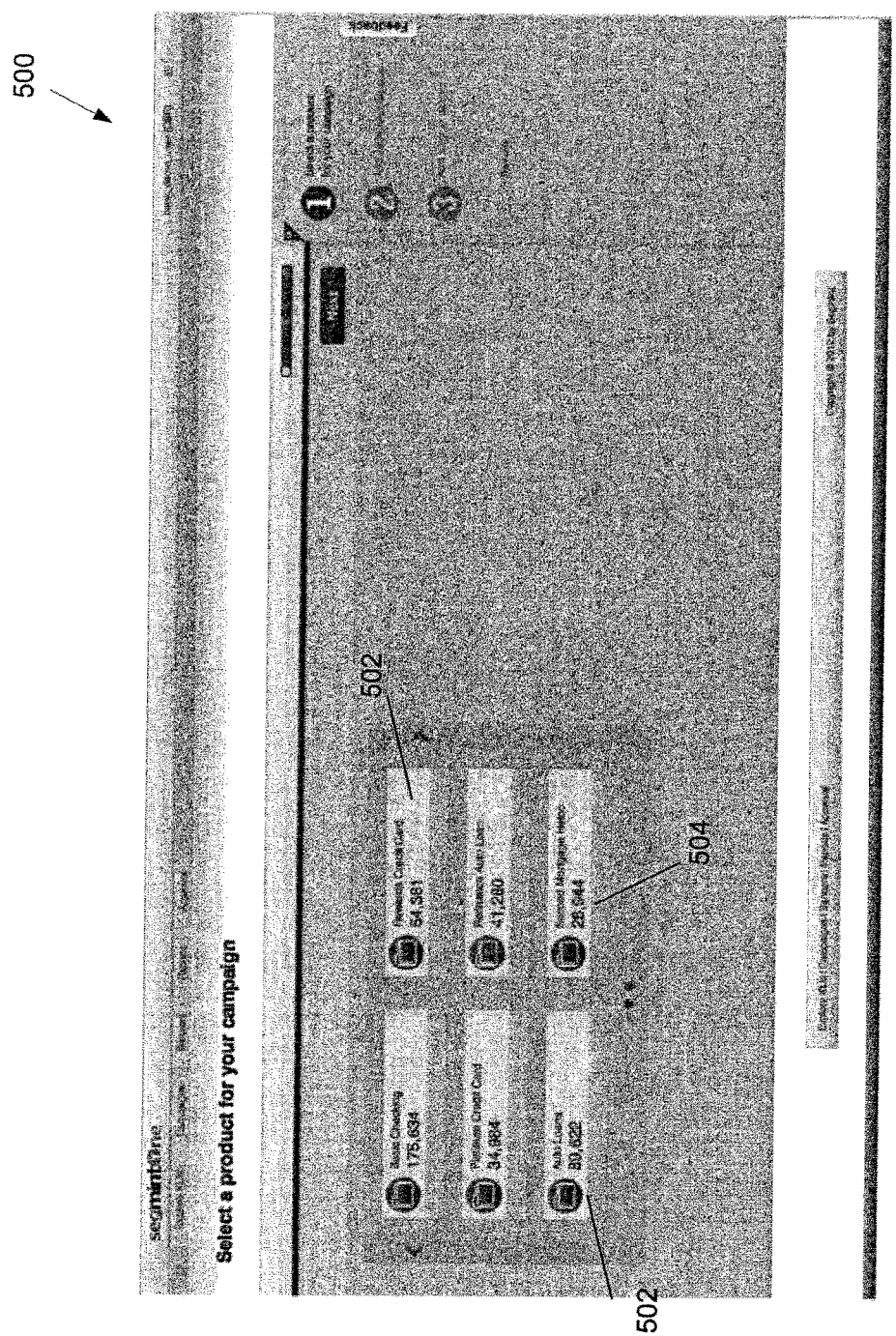
FIG. 14 illustrates a screenshot of a "customization" page presented to a user in which a product and/or service for the campaign is selected.

FIG. 14 illustrates a screenshot 500 of a "customization" page that is presented to a user in which a product and/or service for the advertising campaign is selected. This screen 500 presents a list of products and/or services 502 that the user is able to create an adverting campaign for. For example, the list of products or service 502 includes basic checking, rewards credit card, platinum credit card, refinance auto loan, auto loans, second mortgage, and the like. The list of products or services 502 also includes a number of consumers 504 that would be targeted by the advertising campaign.

Figure 15:
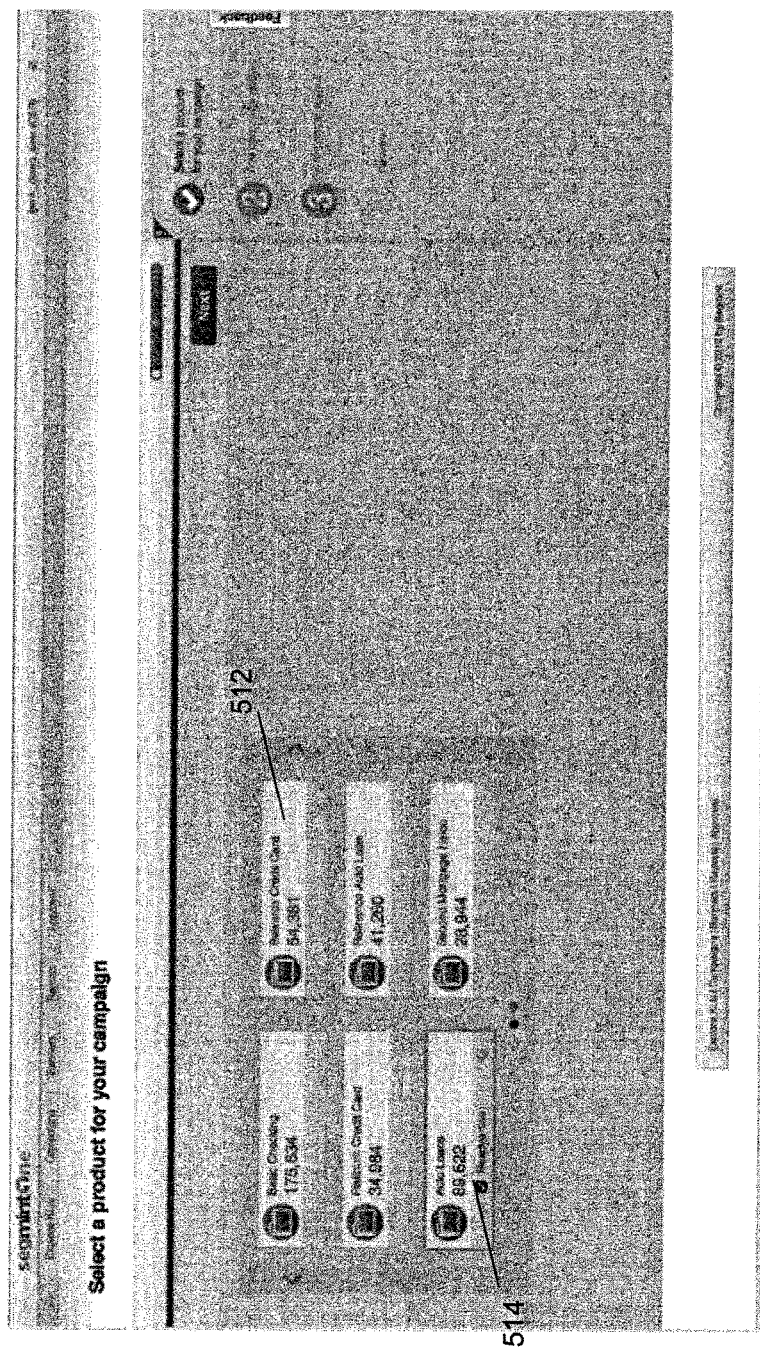
FIG. 15 illustrates a screenshot of a "customization" page presented to a user in which a product for the campaign is selected.

FIG. 15 illustrates a screenshot 510 of a "customization" page presented to a user in which a product for the advertising campaign is selected. This screen 510 includes a selected product or service 512 and the option to readvertise 514 the advertising campaign to consumer which have already been targeted by the advertising campaign.

Figure 16:
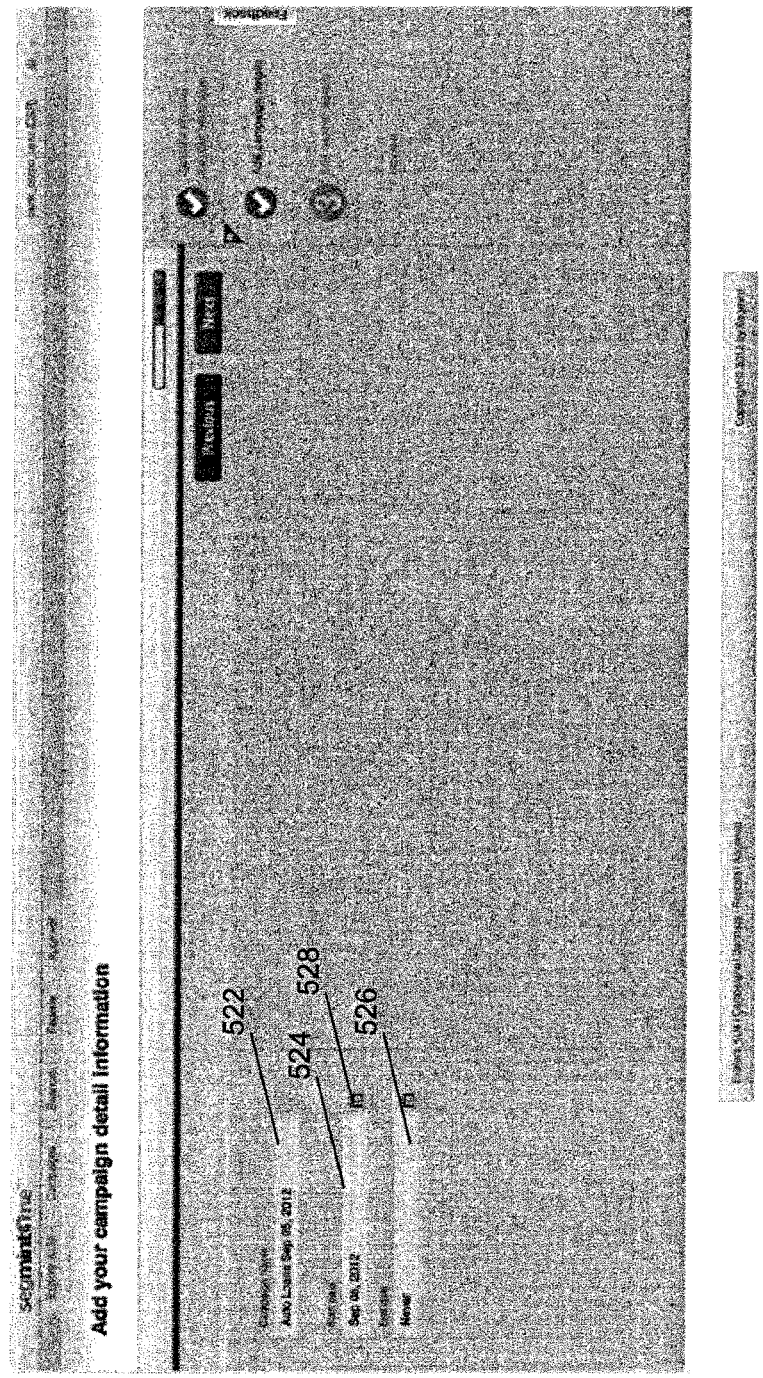
FIG. 16 illustrates a screenshot of a "customization" page presented to a user in which campaign detail information is added.

FIG. 16 illustrates a screenshot 520 of a "customization" page presented to a user in which campaign detail information is added to the advertising campaign. This screen 520 includes the advertising campaign name 522, the start date 524 of the advertising campaign, and the end date of the advertising campaign 526. The advertising campaign start date 522 and end date 524 include calendar pop-up screens 528 in which the user selects the starting and end dates.

Figure 17:
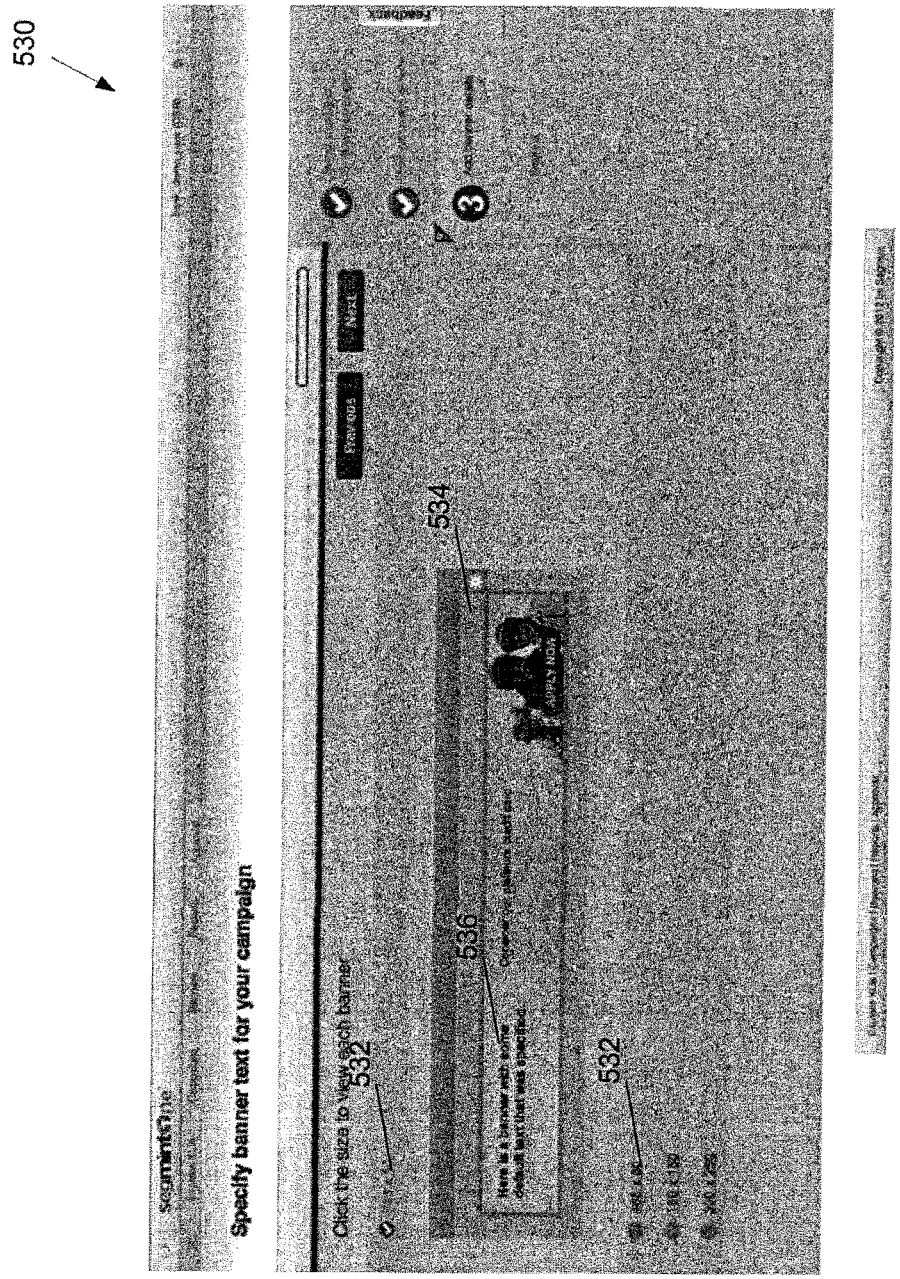
FIG. 17 illustrates a screenshot of a "customization" page presented to a user in which banner text for the campaign is specified.

FIG. 17 illustrates a screenshot 530 of a "customization" page presented to a user in which banner text for the advertising campaign is specified. This screen 530 presents a list of banner ad sizes 532 which are available for the advertising campaign. After selection of a banner size, the screen presents the corresponding banner template 534 including editable text for the advertising campaign.

Figure 18:
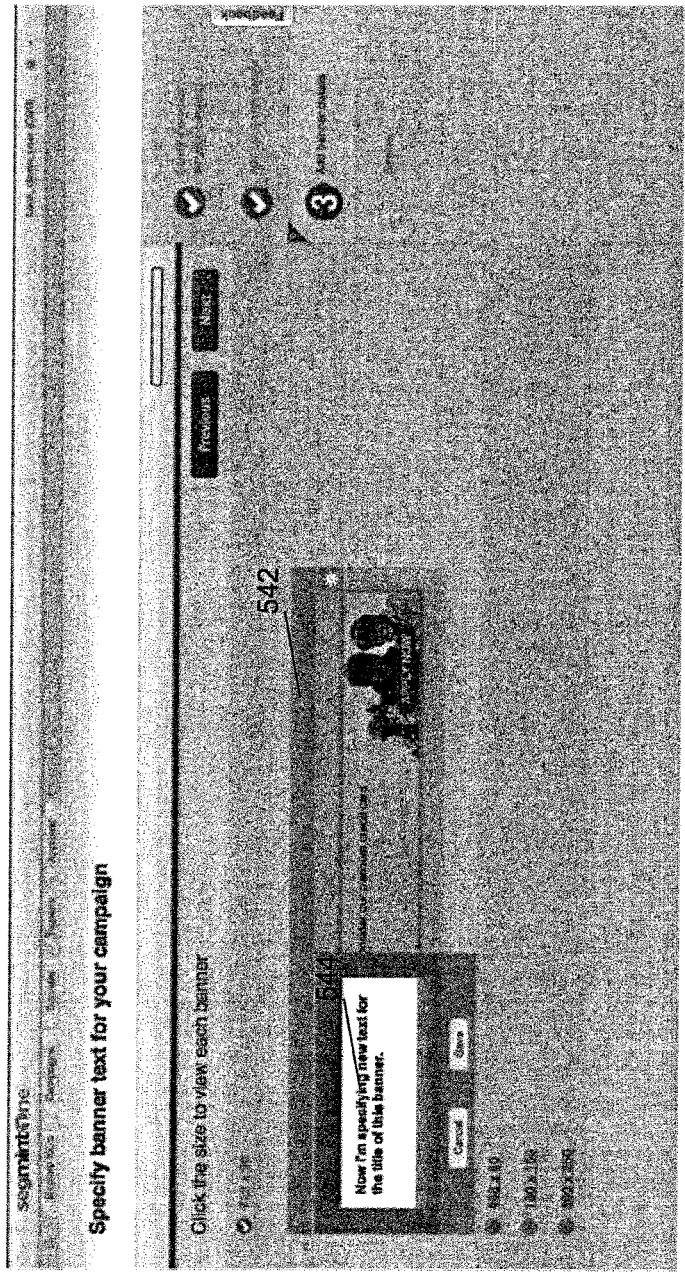
FIG. 18 illustrates a screenshot of a "customization" page presented to a user in which banner text for the campaign is specified.

FIG. 18 illustrates a screenshot 540 of a "customization" page presented to a user in which banner text for the advertising campaign is specified. This screen 540 presents the corresponding banner template 542 for the selected banner size. The screen 540 also presents an editable text screen 544 which enables the user to edit the text of the banner template 542.

Figure 19:
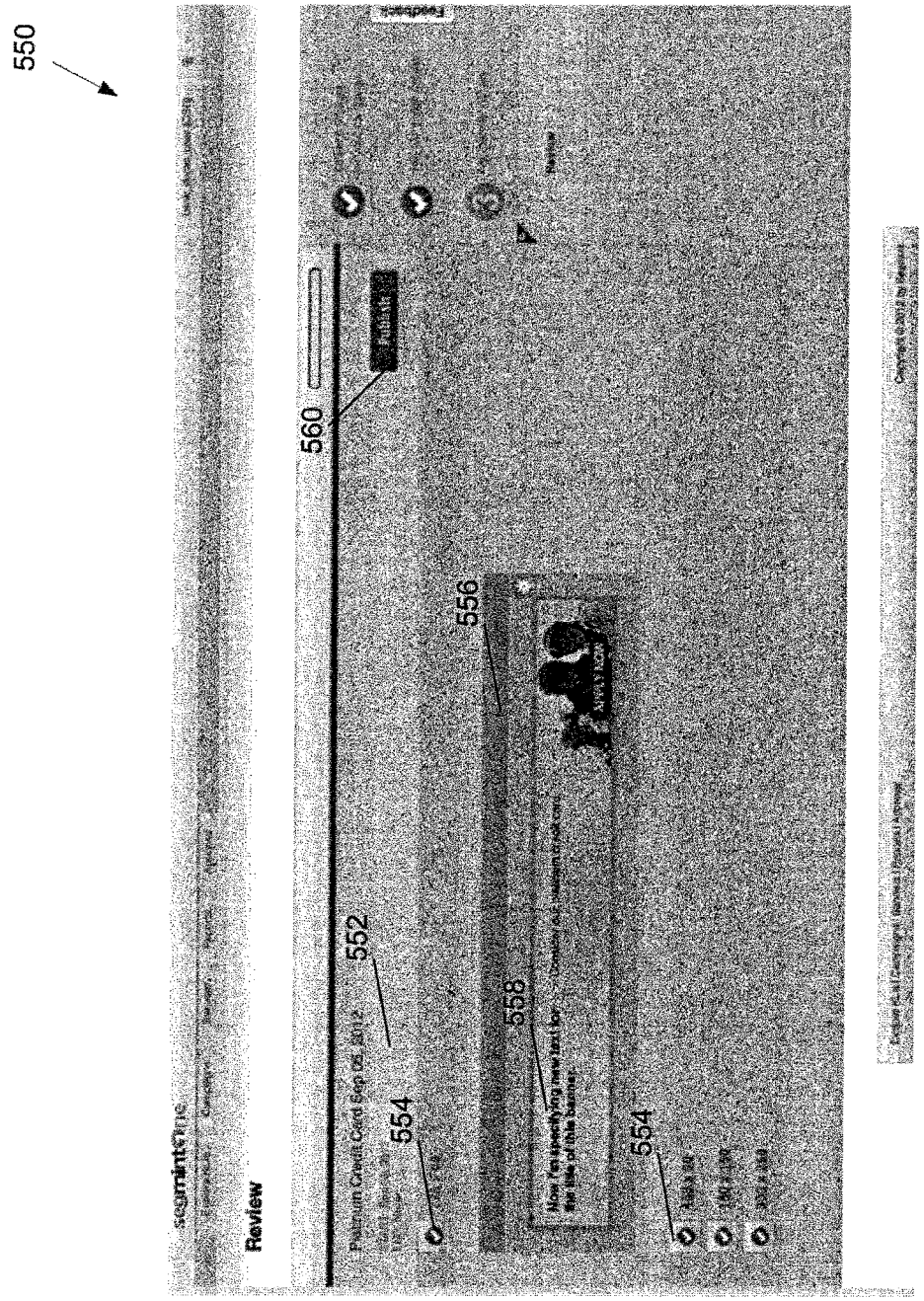
FIG. 19 illustrates a screenshot of a "customization" page presented to a user in which the advertising campaign is reviewed.

FIG. 19 illustrates a screenshot 550 of a "customization" page presented to a user in which the advertising campaign is reviewed. The screen 550 presents the advertising campaign detail information 552, selected banner sizes 554, and the corresponding banners 556 included the edited text 558. The screen 550 also enables the user to publish 560 the advertising campaign.

Figure 20:
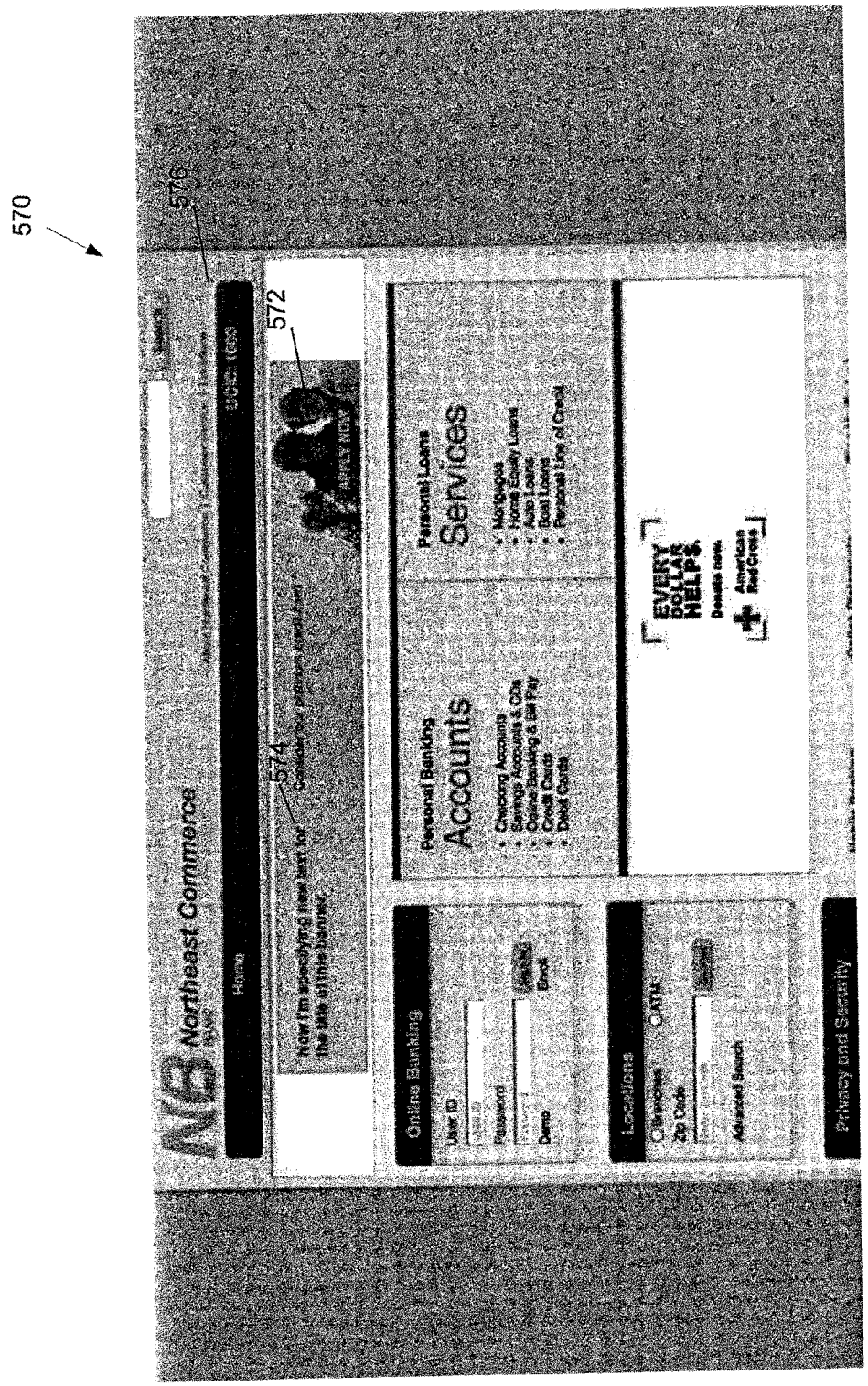
FIG. 20 illustrates a screenshot of a "delivery" page presented to a targeted consumer in which the advertising campaign is displayed.

FIG. 20 illustrates a screenshot 570 of a "delivery" page presented to a targeted consumer in which the advertising campaign is displayed. The screen 570 presents the banner 572 of the advertising campaign including the edited text 574 displayed on a delivery website 576.

As stated above, the methods described herein may be implemented in a computer program product that may be executed on a processor 216 or computing device. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit, such as the processor 216 or some other suitable processor, and a system bus (not shown) that couples various system components including a system memory, such as the database or some other suitable computer-readable medium, to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer. Additionally, "module," as used herein, denotes a set of computer-executable instructions, software code, program, routine, or other computer-executable means for performing the described function, or the like, which is stored on a computer-readable medium and/or executed by one or more processors, as will be understood by those of skill in the art. Each module described herein may comprise software, one or more hardware components, or a combination thereof.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

A method and system for generating targeted advertising campaigns based on classifications has been described with reference to specific embodiments. Modifications and alterations will occur to those upon reading and understanding the preceding detailed description. For example, the method and system described above can also be used to deliver targeted content—content that is not an advertisement—to consumers based on the above described classification and transactional metrics. The invention is not limited to only those embodiments described above. Instead, the invention is intended to cover all modifications and alterations that come within the scope of the appended claims and the equivalents thereof.

Figure 21:
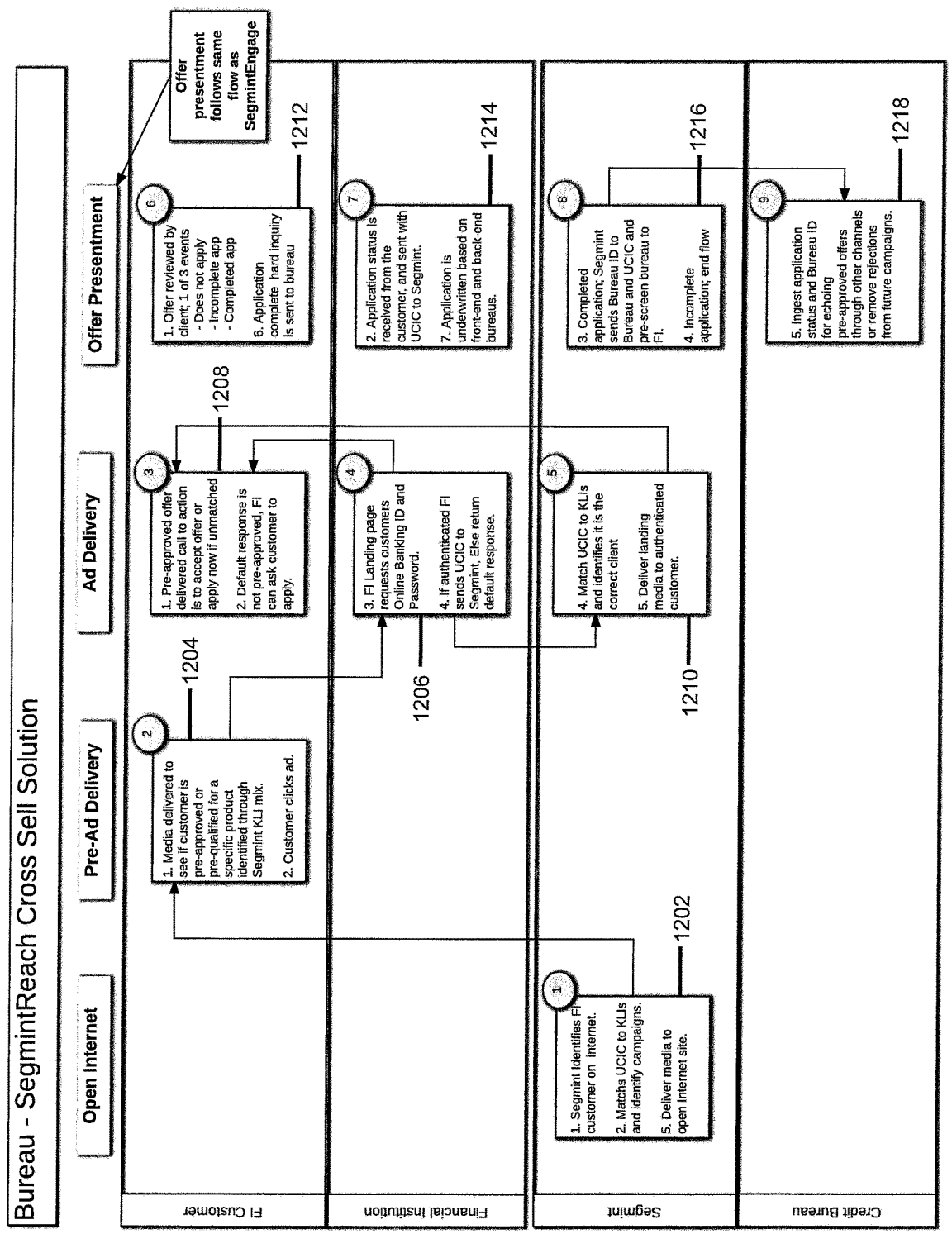
FIG. 21 is a flow chart of another embodiment of the present disclosure.

FIG. 21 shows a method 1200 in accordance with another embodiment of the present disclosure. The method 1200 includes processes 1202-1218. At 1202, the third party advertisement provider identifies one or more customers of a financial institution on the Internet. The third party advertisement provider then matches a UCIC to previously-generated KLIs to identify one or more campaigns with which to present an offer to the customer. A media (e.g., a web page, a pop-up advertisement, and the like) are presented to the customer on an open Internet site. At 1204, a media (such as a website or a "side bar" on a web page) containing an ad for one or more specific products that is identified through a KLI mix or pool operated by the third party advertisement provider is delivered to a prospective customer to see if the prospective customer is pre-approved or pre-qualified for the selected product(s). At 1206, the financial institution landing page requests an online banking ID and password from the customer. If the customer is authenticated (i.e., the customer enters the correct Banking ID and password, the financial institution sends a UCIC associated with the customer to the third party advertisement provider. Otherwise, the method 1200 goes to a default respond. The default response to the pre-approved offer is "not pre-approved," so the financial institution can ask the customer to apply. At 1208, the pre-approved offer is delivered to the customer with a call to action to accept the offer or apply now if unmatched. At 1210, the third party advertisement provider matches the UCIC received from the financial institution to the KLIs to verify that the authenticated customer is the correct customer. The third party advertisement provider then delivers a landing media to the authenticated customer. At 1212, the offer is reviewed by the customer. The customer either: (1) does not apply; (2) begins to fill out an application for the offer but does not finish it (i.e., an incomplete application); or (3) completes the application. If the customer completes the application, a hard credit inquiry is sent to the credit bureau. At 1214, the application status is received by the financial institution from the customer, and is sent with the UCIC to the third party advertisement provider. The application is underwritten by the financial institution based on the front-end and back-end bureaus. At 1216, the third party advertisement provider receives the completed application from the financial institution. The third party advertisement provider sends the bureau ID to the credit bureau, and sends the UCIC and pre-screen bureau to the financial institution. If the customer submits an incomplete application, the method 1200 ends. In one embodiment, the customer is prompted to complete the incomplete application. At 1218, the credit bureau ingests the application status and the bureau ID for echoing pre-approved offers through other channels, or removes rejections from future advertisement campaigns.

Methods and systems for providing targeted advertising campaigns based on classifications have been described with reference to specific embodiments. Modifications and alterations will occur to those upon reading and understanding the preceding detailed description. For example, the method and system described above can also be used to deliver targeted content—content that is not an advertisement—to customers based on the above described classification and transactional metrics. The invention is not limited to only those embodiments described above. Instead, the invention is intended to cover all modifications and alterations that come within the scope of the appended claims and the equivalents thereof.

The invention claimed is:

1. A method of providing a personalized advertisement campaign purpose, the method comprising:
    identifying at least one customer of a financial institution via at least one cookie associated with the at least one customer;
    matching a prospective unique customer identification code with at least one key lifestyle indicator, which describe customer attributes, associated with the at least one customer;
    delivering online a pre-advertisement to at least one selected customer that is matched with the key lifestyle indicators;
    receiving an authentication of at least one selected customer from the financial institution; and
    delivering a financial application form associated with the pre-advertisement to the at least one authenticated customer who accepts the pre-advertisement;
    receiving a status of the financial application form from the financial institution associated with the at least one prospective customer; and
    upon receiving a status of a complete financial application form by at least one designated customer of the prospective customers, the method further comprises:
        receiving a designated unique customer identification code from the financial institution, the designated unique customer identification code being associated with the at least one designated customer;

matching the designated unique customer identification code with the at least one previously-assigned key lifestyle indicator for the customer, which describes the customer's attributes as deduced from financial transaction data of the customer to produce a confirmed unique customer identification code associated with at least one confirmed customer of the designated customers; and sending the confirmed unique customer identification code to the financial institution.

2. The method of claim 1, further including:

maintaining a status of anonymity for each customer of the at least one financial institution.

3. The method of claim 1, wherein delivering online a pre-advertisement to at least one customer of the plurality of customers further includes:

identifying at least one product of a plurality of products based on at least one key lifestyle indicator; and generating the pre-advertisement for the at least one identified product.

4. The method of claim 1, further including:

receiving the at least one cookie and the prospective unique customer identification code from the financial institution.

5. The method of claim 1, wherein receiving the prospective unique customer identification code from the financial institution further includes:

matching the prospective unique customer identification code to the at least one authenticated customer when at least one prospective customer accepts the pre-advertisement.

6. The method of claim 1, the financial application status being indicative of one of complete, incomplete, and not applied, a status of complete being associated with at least one designated customer of the plurality of prospective customers.

7. The method of claim 6, wherein receiving a status of a complete financial application form by at least one designated customer of the prospective customers further includes:

upon receiving a status of "not applied", erasing all information relating to the prospective customer.

8. The method of claim 1, wherein receiving a status of a complete financial application form by at least one confirmed customer of the prospective customers further includes:

receiving a prospect credit bureau ID from a credit bureau;

matching a prospect credit bureau ID with the confirmed unique customer identification code to produce a confirmed credit bureau ID associated with the at least one confirmed customer;

sending the confirmed bureau ID, the completed application status, and a status of a hard inquiry related to the confirmed credit bureau ID to the credit bureau.

9. A system for providing a personalized advertisement campaign purpose, the system comprising:

at least one database storing at least one of a plurality of products associated with key lifestyle indicators of a plurality of financial institution customers; and at least one processor programmed to:

identify at least one customer of a financial institution via at least one cookie associated with the at least one customer;

match a prospective unique customer identification code with at least one key lifestyle indicator, which describe customer attributes, associated with the at least one customer;

deliver online a pre-advertisement to at least one selected customer that is matched with the key lifestyle indicators;

receive an authentication of at least one selected customer from the financial institution; and deliver a financial application form associated with the pre-advertisement to the at least one authenticated customer who accepts the pre-advertisement;

receive a status of the financial application form from the financial institution associated with the at least one prospective customer; and upon receiving a status indicating that the customer has completed the financial application form:

receive a designated unique customer identification code from the financial institution, the designated unique customer identification code being associated with the at least one designated customer;

match the designated unique customer identification code with the prospective unique customer identification code via at last one previously-assigned key lifestyle indicator for the customer, which describes the customer's attributes as deduced from financial transaction data of the customer to produce a confirmed unique customer identification code associated with at least one confirmed customer of the designated customers; and send the confirmed unique customer identification code to the financial institution.

10. The system of claim 9, wherein the at least one processor is further programmed to:

maintain a status of anonymity for each customer of the at least one financial institution.

11. The system of claim 9, wherein the at least one processor is further programmed to:

identify at least one product of a plurality of products stored in the database based on at least one key lifestyle indicator; and generate the pre-advertisement for the at least one identified product.

12. The system of claim 9, wherein the at least one processor is further programmed to:

receive the at least one cookie and the prospective unique customer identification code from the financial institution.

13. The system of claim 9, wherein the at least one processor is further programmed to:

match the prospective unique customer identification code to the at least one authenticated customer when at least one prospective customer accepts the pre-advertisement.

14. The system of claim 9, wherein the financial institution status being indicative of one of complete, incomplete, and not applied, a status of complete being associated with at least one designated customer of the plurality of prospective customers.

15. The system of claim 14, wherein the at least one processor is further programmed to:

upon receiving a status indicating that the customer has not completed the financial application form, erase all information relating to the prospective customer.

16. The system of claim 9, wherein the at least one processor is further programmed to:

receive a prospect credit bureau ID from a credit bureau;

match the prospect credit bureau ID with the confirmed unique customer identification code to produce a confirmed credit bureau ID associated with the at least one confirmed customer;

send the confirmed bureau ID, the completed application status, and a status of a hard inquiry related to the confirmed credit bureau ID to the credit bureau.

17. A system for providing a personalized advertisement campaign purpose, the system comprising:

at least one database storing at least one of a plurality of products associated with key lifestyle indicators of a plurality of financial institution customers; and at least one processor programmed to:

target at least one customer of a financial institution via at least one cookie associated with the at least one customer, a status of anonymity being maintained for each customer of the at least one customer;

receive the at least one cookie and a prospective unique customer identification code from the financial institution match the prospective unique customer identification code with at least one key lifestyle indicator, which describe customer attributes, associated with the at least one customer;

deliver online a pre-advertisement to at least one selected customer that is matched with the key lifestyle indicators;

receive an authentication of at least one selected customer from the financial institution;

match the prospective unique customer identification code to the at least one authenticated customer when at least one prospective customer accepts the pre-advertisement;

deliver a financial application form associated with the pre-advertisement to the at least one authenticated customer who accepts the pre-advertisement; and receive a status of the financial application form from the financial institution associated with the at least one prospective customer, the status being indicative of one of complete, incomplete, and not applied, a status of complete being associated with at least one designated customer of the plurality of prospective customers; and upon receiving a status indicating that the customer has completed the financial application form:

receive a designated unique customer identification code from the financial institution, the designated unique customer identification code being associated with the at least one designated customer;

match the designated unique customer identification code with the prospective unique customer identification code via at least one previously-assigned key lifestyle indicator for the customer, which describes the customer's attributes as deduced from financial transaction data of the customer to produce a confirmed unique customer identification code associated with at least one confirmed customer of the designated customers; and send the confirmed unique customer identification code to the financial institution.

18. The system of claim 17, wherein the at least one processor is further programmed to:

identify at least one product of a plurality of products stored in the database based on at least one key lifestyle indicator; and generate the pre-advertisement for the at least one identified product.

19. The system of claim 17, wherein the at least one processor is further programmed to:

upon receiving a status indicating that the customer has not completed the financial application form, erase all information relating to the prospective customer.

20. The system of claim 17, wherein, upon completion of the financial application form by the selected customer the at least one processor is further programmed to:

receive a prospect credit bureau ID from a credit bureau;

match a prospect credit bureau ID with the confirmed unique customer identification code to produce a confirmed credit bureau ID associated with the at least one confirmed customer;

send the confirmed bureau ID, the completed application status, and a status of a hard inquiry related to the confirmed credit bureau ID to the credit bureau.

* * * * *